United States Patent
Matsumoto

(10) Patent No.: US 7,160,191 B2
(45) Date of Patent: Jan. 9, 2007

(54) GAME MACHINE, METHOD AND PROGRAM

(75) Inventor: Takuya Matsumoto, Kanagawa (JP)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 10/354,660

(22) Filed: Jan. 30, 2003

(65) Prior Publication Data

US 2003/0190951 A1 Oct. 9, 2003

(30) Foreign Application Priority Data

Apr. 4, 2002 (JP) .............................. 2002-102932

(51) Int. Cl.
*A63F 9/24* (2006.01)
(52) U.S. Cl. .......................................... 463/31; 463/43
(58) Field of Classification Search .................... None
See application file for complete search history.

(56) References Cited

U.S. PATENT DOCUMENTS 5,261,820 A * 11/1993 Slye et al. ...................... 463/1

OTHER PUBLICATIONS

Max Payne video game as described at wikipedia (http://en.wikipedia.org/wiki.Max_Payne), Max Payne release date Jul. 2001, 12 pages.*

Max Payne game review by Brian Crecente (http://www.geek.com/gaming/gamerrevs/maxpayne), posted Aug. 9, 2001, 9 pages.*

Super Pac-Man Video Game as described at Killer List of Video Games, (http://klov.com/S/Super_Pac_Man.html), release date 1982, 6 pages.*

The Bard's Tale as described by its Game Manual and its Command Summary Card, Software copyright by Interplay Productions, copyright 1985, Manual copyright by Electronic Arts, copyright 1985, 3 Pages of Command Summary plus 6 pages from Manual including Cover + Manual pp. 1, 9, 11, 13 and Notice for 9 total pages.*

* cited by examiner

*Primary Examiner*—Mark Sager
(74) *Attorney, Agent, or Firm*—Lee & Hayes, PLLC

(57) ABSTRACT

A game player can change the rate at which a game character is rendered in a video game with respect to the rendering rate of its surroundings. This change results in a visual appearance in which the game character seems to be time traveling. This visual appearance can be that the game character and its surroundings are moving in opposing directions in time, in the same direction in time but at different rates, or that the game character is moving in time but its surroundings are not moving in time. A user interface is provided through which a player can change the relative rendering rates of the game character and its surroundings to provide the visual appearances of several display modes including fast forward, slow forward, pause, rewind, or recording/playback display modes.

16 Claims, 19 Drawing Sheets

| COMBINATION OF ITEMS | | | | | REMARKS |
|---|---|---|---|---|---|
| ☆ | ☆ | ☾ | ☾ | ☾ | SUSPEND FOR 15 SECONDS |
| ☾ | ☾ | ☾ | ☾ | ☾ | SUSPEND FOR 10 SECONDS |
| ☆ | ☆ | ☆ | ANY | ANY | FAST FEED FOR 5 SECONDS |
| ☾ | ☾ | ☾ | ANY | ANY | FAST FEED FOR 5 SECONDS |
| ♡ | ♡ | ♡ | ♡ | ♡ | REWIND FOR 15 SECONDS |
| ♡ | ♡ | ♡ | ◇ | ◇ | REWIND FOR 10 SECONDS |
| △ | △ | △ | △ | △ | RECORD FOR 10 SECONDS TO ENABLE REPRODUCTION |
| ☆ | ☾ | ◇ | ♡ | △ | REWIND FOR 10 SECONDS |
| ☾ | ◇ | ♡ | △ | ✽ | FAST FEED FOR 10 SECONDS |
| ◇ | ♡ | △ | ✽ | ☆ | RESET ENEMY |
| ♡ | △ | ✽ | ☆ | ☾ | RESET LUMBER |
| △ | ✽ | ☆ | ☾ | ◇ | FAST FEED FOR 10 SECONDS |

FIG. 6

GAME MACHINE, METHOD AND PROGRAM

TECHNICAL FIELD

This invention relates to video games, and more particularly, to a video game that enables a player to control the time dimension of a game character with respect to the game character's surroundings.

BACKGROUND

Video games commonly feature game play in which a game player sees a three dimensional (3D) display while controlling the movements of a game character or some other object with a game controller, joy stick or keyboard. Some video games allow the game player to watch a recording of a previously played game. By watching the recording, the player may be able to see what mistakes and accomplishments were made during game play. The game player can learn from this review. Then, the game player can try playing the game again and perhaps do better.

Some video games allow the game player to see a recording of prior game play in different ways. In these video games, the game player can view the prior game play forwards, backwards, in slow motion, or in fast motion. To do this, the player gives viewing commands when operating the video game that are similar to those given when operating a Digital Video Disc (DVD) player.

An example of recording game play is seen in the Sega Rally™ video game provided by the Sega Corporation, of San Francisco, Calif., U.S.A. In this video game, a game player can see a 'ghost car' in a car race. The images of the ghost car are actually a recording of a car race during prior game play. This video game can be played in a mode in which the game player controls a car in a race against the ghost car. In this mode, for instance, the images of the ghost car that the game player sees can be a replay of the personal best race of the game player. In effect, the game player races against the ghost car in an attempt to beat their own personal best race.

Some video games allow the game player to speed up or slow down game play. An example of this is seen in the Max Payne™ video game provided by the Microsoft Corporation of Redmond, Wash., U.S.A. In this video game, a game character can move in "bullet time", in which the game character has the ability to move much faster. To aid the game player in an appreciation of the game character's fast moves, all game play during the bullet time is presented to the player in slow motion. As such, fast moving objects, including the game character, are seen moving in slow motion while slow moving objects appear to be stationary. The bullet time effect is accomplished by rendering of all objects in the scene in slow motion.

Thus, conventional video games allow a game player to record and replay prior game play, as well as to speed up or slow down game play. As such, conventional video games show all objects in all scenes moving in the same dimension of time. Video games have yet to allow a game player to control the movements of some objects during game play in the fourth dimension—time. In the interest of further technical advancement in video gaming and in attracting game players by providing exciting game play, it would be an advantage in the art to provide a video game that allows the game player to control the movements of some of the objects in game play not only in the three dimensions, but also in the fourth dimension. Just such a video game is disclosed in this patent.

SUMMARY

A video game enables a player to change the rate at which a player-controlled game character is rendered with respect to the rate at which the game character's surroundings are rendered. This relative change in the rendering rates provides a visual appearance that the time dimension of the player-controlled game character is different than time dimension of the game character's surroundings. The visual appearance can be that the game character and the game character's surroundings are moving in opposing directions in time, such as where the game character appears to be moving forward in time while the game character's surroundings are moving backward in time. Alternatively, the visual appearance can be that the game character and its surroundings are both moving in the same direction in time but at different rates. In a further alternative, the visual appearance can be that game character is moving in time but the game character's surroundings are not moving in time.

The video game can employ a user interface through which a player can change the relative rendering rates of the game character and its surroundings. The user interface permits the player to select the visual appearances from among several display modes including a fast forward display mode, a slow forward display mode, or a pause display mode. The display mode can also be a rewind display mode or a recording/playback display mode.

BRIEF DESCRIPTION OF THE DRAWINGS

The same reference numbers are used throughout the figures to reference like components and features.

FIG. 6 is an explanatory view showing a table, where each entry in the table reflects the relationship between a particular CAT power obtained that corresponds to a particular collection items that appear in the respective collections of items display of the entry;

DETAILED DESCRIPTION

Figure 1:
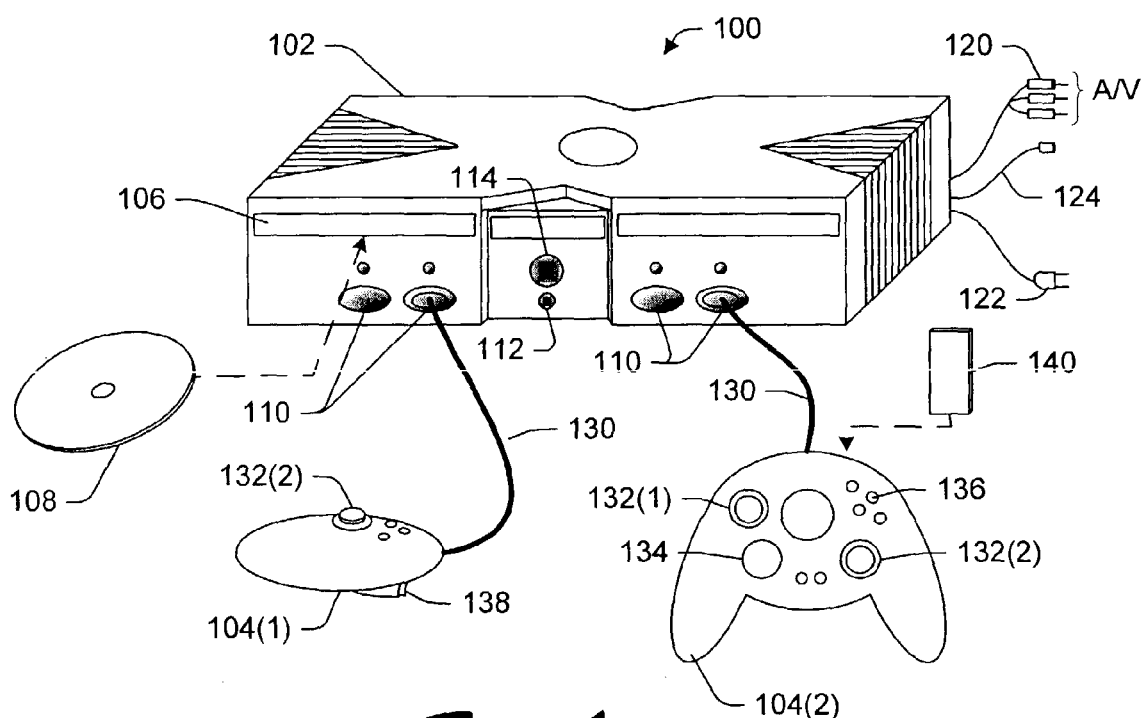
FIG. 1 is a perspective view typically showing an appearance of a game machine according to an implementation.

A video game features a game character that is maneuvered under the control of a player through the game character's surroundings in a virtual world that is displayed on a display screen. In one implementation of the treasure hunting video game genre, the game character collects treasures its finds in its surroundings. Depending upon which treasures are collected, different powers are achieved. An achieved power can be activated by the player to change the rate at which the game character is rendered with respect to the rate at which the game character's surroundings are rendered. The visual appearance of the power, when activated, is that the time dimension of the game character appears to be different than time dimension of the game character's surroundings. In another implementation, the powers are achieved so that the player can manipulate time to the benefit of game character. These time manipulation powers, when activated by the player, Change an Axis of Time in game play for the game character with respect to its surroundings. Thus, the phrase 'Change-an-Axis-of-Time' (CAT) power is now introduced.

Each CAT power is achieved through skillful maneuvering of the player-controlled game character by the player. The CAT powers are operationally similar to those commands that are conventional for a video player-recorder, such as a Video Cassette Recorder (VCR). These conventional commands correspond to the video display modes of reverse, fast forward, slow forward, pause, record, and playback. When activated, a CAT power effects the movement of the game character in a first time axis through surroundings that move in a different, second time axis. By activation of the CAT power, the game character becomes a time traveler in its surroundings.

One example of the game character experiencing time travel is the pause CAT power. The pause CAT power allows the game player to stop the motion of everything that is displayed in the display screen on a suspended second time axis while permitting the game character to move freely in a moving first time axis through its surroundings. The resultant visual appearance to the player is that the game character is moving in a world of suspended animation. As such, the game player can activate the pause CAT power to the advantage of the game character being controlled so as to vanquish enemies in their state of suspended animation without a fight. The game character can also collect immobile treasures found in its surroundings. For instance, if game player activates the pause CAT power when the game character is immersed in a body of water, the former can be maneuvered through the latter with the visual display of neither waves nor currents.

Another example of the game character traveling through time is the rewind CAT power. The rewind CAT power, when activated, allows the game player to see a visual display in which everything but the game character moves backwards in time. For instance, the game character can move in one direction along a first time axis while its surroundings move in an opposite direction on along a second axis of time. In one implementation, a play can maneuver the game character as it moves forward in time while its surroundings are being displayed in a reverse direction in time. The rewind CAT power gives the game player the impression of prior game play being displayed in reverse order without the game character also being moved backward in time. As such, everything that is displayed in the display screen moves in the reverse direction with the exception of the player-controlled game character. After the rewind CAT power has been exercised, the display of game play is then depicted as being at a previous place in time. Game play can then proceed forward in time during which, for instance, the game character can be maneuvered by the game player to change a previous outcome of prior game play. By way of example of rewind CAT power, objects in the surrounding that were moving in one direction prior to the activation of the rewind CAT power would move in the opposite direction when the rewind CAT power is activated. The exception, however, is the game character whose movements are unaffected by the player's activation of the rewind CAT power. Other examples of various CAT powers are discussed below.

Gaming System

FIG. 1 shows an exemplary gaming system 100. It includes a game console 102 and up to four controllers, as represented by controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CDROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be equipped with internal or externally added network capabilities, as represented by the cable or modem connector 124 to facilitate access to a network, such as a local area network (LAN) or the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumb sticks 132(1) and 132(2), a directional or D-pad 134, surface buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:
   (i) Game titles played from CD and DVD discs, from the hard disk drive, or from an online source.
   (ii) Digital music played from a CD in the portable media drive 106, from a compressed file on the hard disk drive (e.g., Windows Media Audio (WMA) format), or from online streaming sources.
   (iii) Digital audio/video played from a DVD disc in the portable media drive 106, from a file on the hard disk drive (e.g., Windows Media Video (WMV) format), or from online streaming sources.

Figure 2:
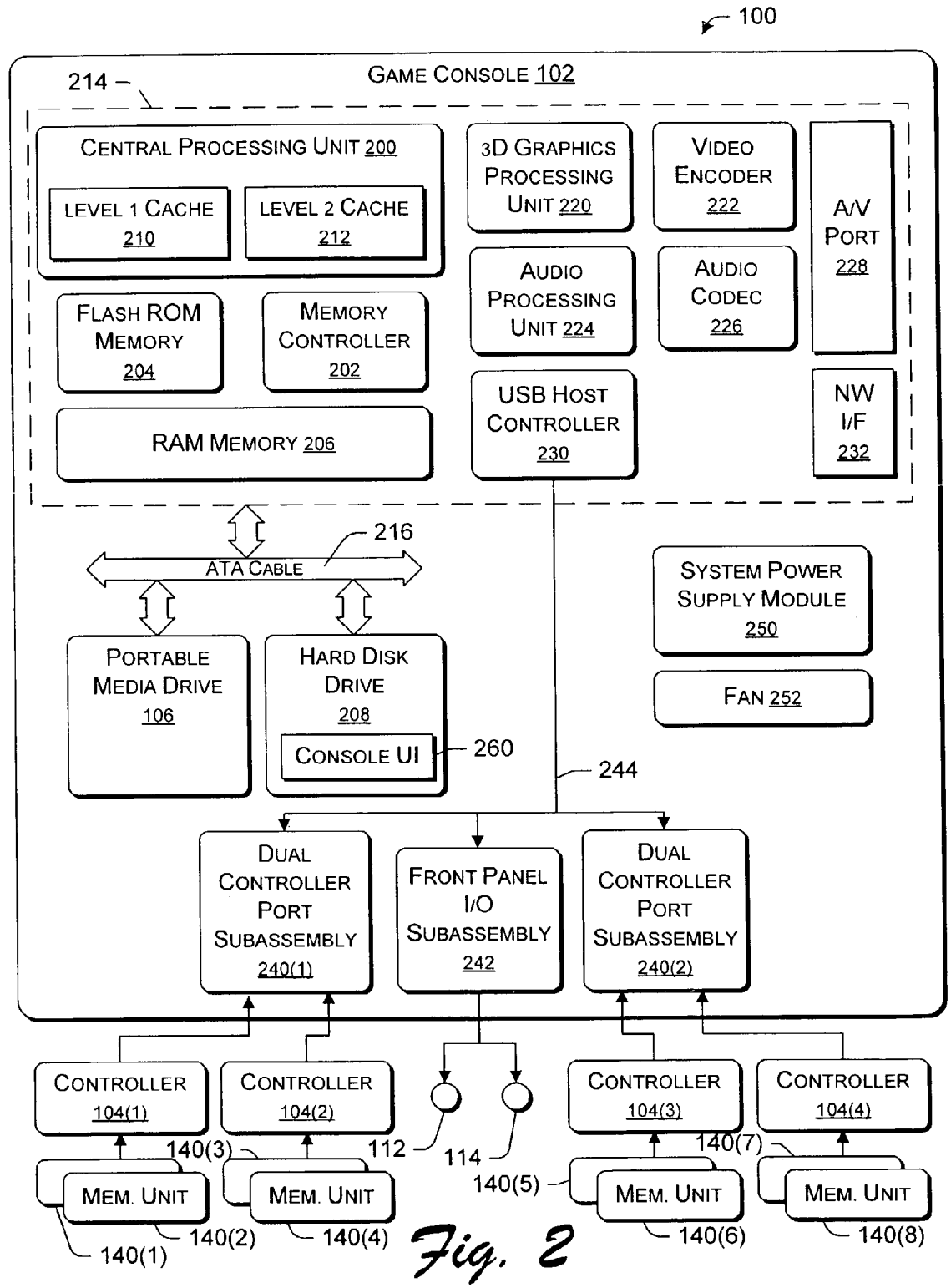
FIG. 2 is a block diagram showing a circuit configuration of the game machine of FIG. 1 according to the implementation.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220–228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)–104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)–104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)–140(8) are illustrated as being connectable to the four controllers 104(1)–104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community.

Video games may be stored on various storage media for play on the game console. For instance, a video game may be stored on the portable storage disc 108, which is read by drive 106. Alternatively, the video game may be stored in hard disk drive 208, being transferred from a portable storage medium or downloaded from a network. During play, portions of the game are temporarily loaded into RAM memory 206, caches 210 and 212, and executed by the CPU 200.

Figure 3:
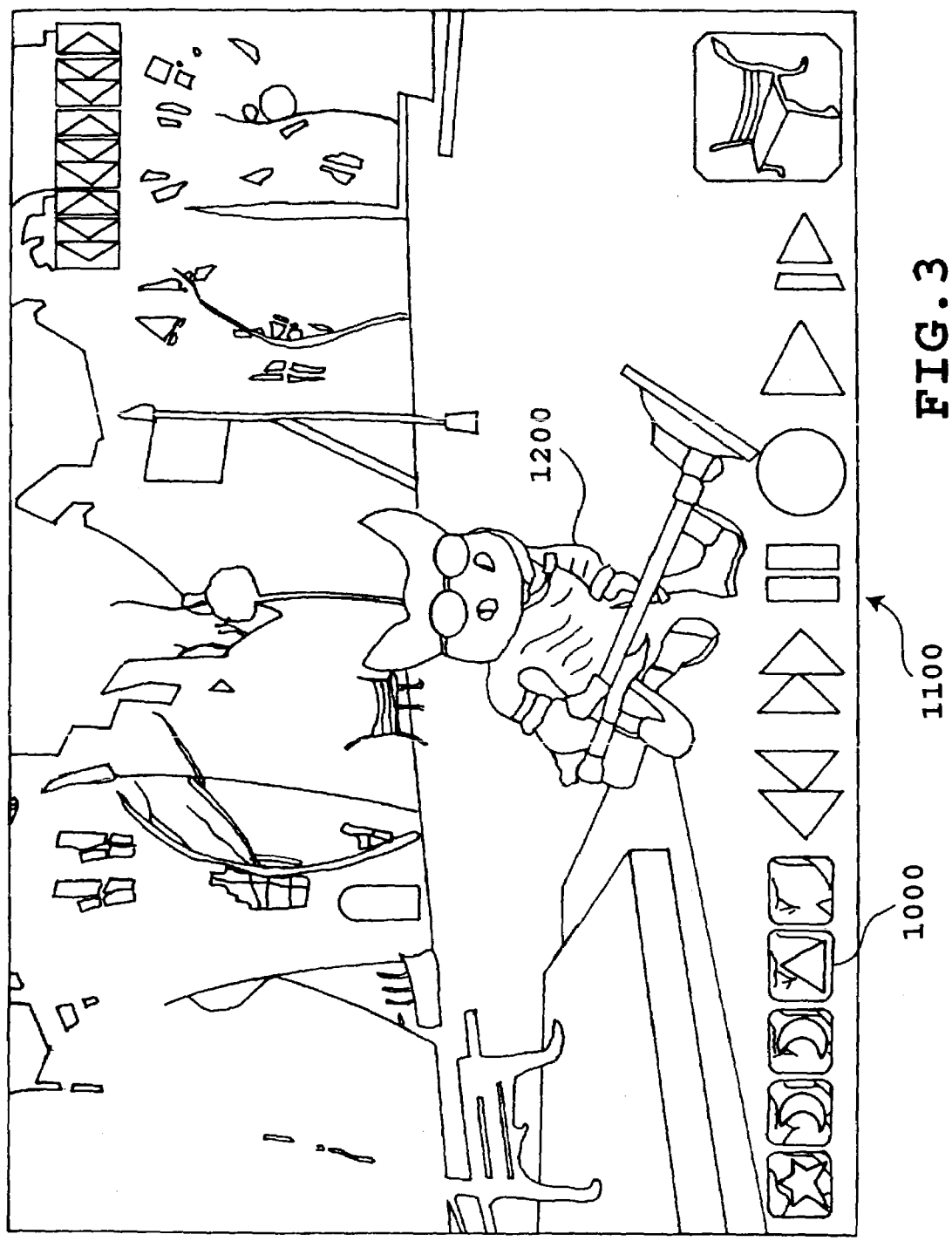
FIG. 3 is an explanatory view showing one example of a game character and the game character's surroundings as depicted on a display screen.

Referring again to FIG. 1, a game program can be executed by the game console 102 within the treasure hunting genre in which stick 132(1) is used to instruct movement of a camera viewpoint on a virtual space such as is seen in FIG. 3. Stick 132(2) is used to instruct movement of a game character through its surroundings in the virtual space. The four (4) buttons 136 can be used to select a CAT power display mode in scene images on the virtual space, as will be described later. The CAT power display modes that can be selected by the player include a fast forward CAT power, a slow forward CAT power, a pause CAT power, a rewind display mode, and a recording/ playback CAT power.

Video Game with CAT Power

FIG. 3 shows an example of a virtual scene of a game that can be displayed on a display screen of a display when the game program is executed by game console 102. In FIG. 3, a collected items display 1000 is seen. Collected items display 1000 shows those items (e.g. treasures) that have been collected by a game character 1200 during game play in a virtual world that is shown on the display screen of the display. Based upon those items that have been collected and are on display in collected items display 1000, the game allows game character 1200 to achieve different CAT powers. Each such CAT power enables the player to change the rate at which the player-controlled game character 1200 is rendered with respect to the rate at which the character's surroundings are rendered in the virtual world. This rendering rate change gives the impression to the player that the time dimension of the player-controlled game character 1200 is different than time dimension of the character's surroundings in the virtual world.

CAT powers give the player the ability to change an axis of time in game play for everything that is displayed on the display screen other than game character 1200. The CAT power that is achieved by game character 1200 is reflected by a CAT Power display 1100. CAT Power display 1100 includes symbols that are readily recognized by users of media player-recorders, including tape recorders, VCRs, etc. As such, the symbols in CAT Power display 1100, from left to right, include the reverse symbol, the fast forward symbol, the pause symbol, the record symbol, the play symbol, and the slow forward symbol. Each such symbol represents a different CAT power that can be acquired by game character 1200 through collection of items using a collector, such as a vacuum cleaner which is seen in FIG. 3 as been held for operational collection use by game character 1200.

As the player operates the stick 132(2) on the controller 104, the game character 1200 is moved on the display screen proportional to the movement of stick 132(2) by the player. If the player operates the stick 132(1) on the controller 104, a camera position for rendering a camera viewpoint on the virtual space is changed proportional to the movement of stick 132(1) by the player, and the display contents of the background (scene) is also changed with the rendered camera viewpoint. During game play, the player operates the sticks 132(1) and 132(2) to find one of more items that are hidden in the background. When a hidden item is found and displayed in the scene, the player can point the collector held by game character 1200 (e.g. the vacuum cleaner) at the item in order to collect the item by operation of the collector. Some of the items that are collected can be displayed in collected items display 1000. Thus, collected items can include a star image or a crescent image as seen in FIG. 3 in collected items display 1000.

Figure 4:
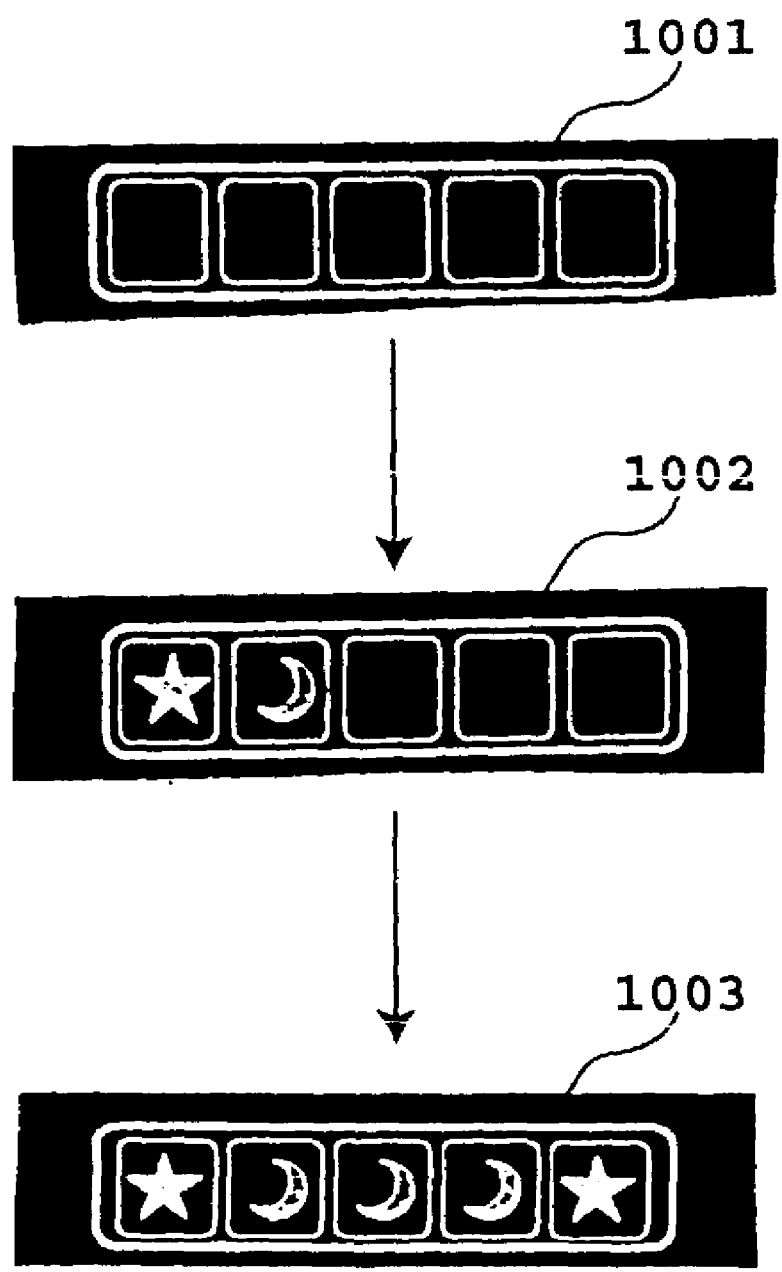
FIG. 4 is an explanatory view of a collections of items display in a sequence that progressively reflects the successive accumulation of various items that have been collected during game play.

FIG. 4 shows items that have been collected during game play by the player's maneuvering of game character 1200 to use the collector held by game character 1200. Items are shown as having been added to and displayed in collected items display 1000. As such, the progressive addition of items collected to collected items display 1000 is seen in FIG. 4. Block 1001 shows that there are no items that have been collected, block 1002 reflects the collection of star and crescent items, and block 1003 show the collection of five (5) items.

Figure 5:
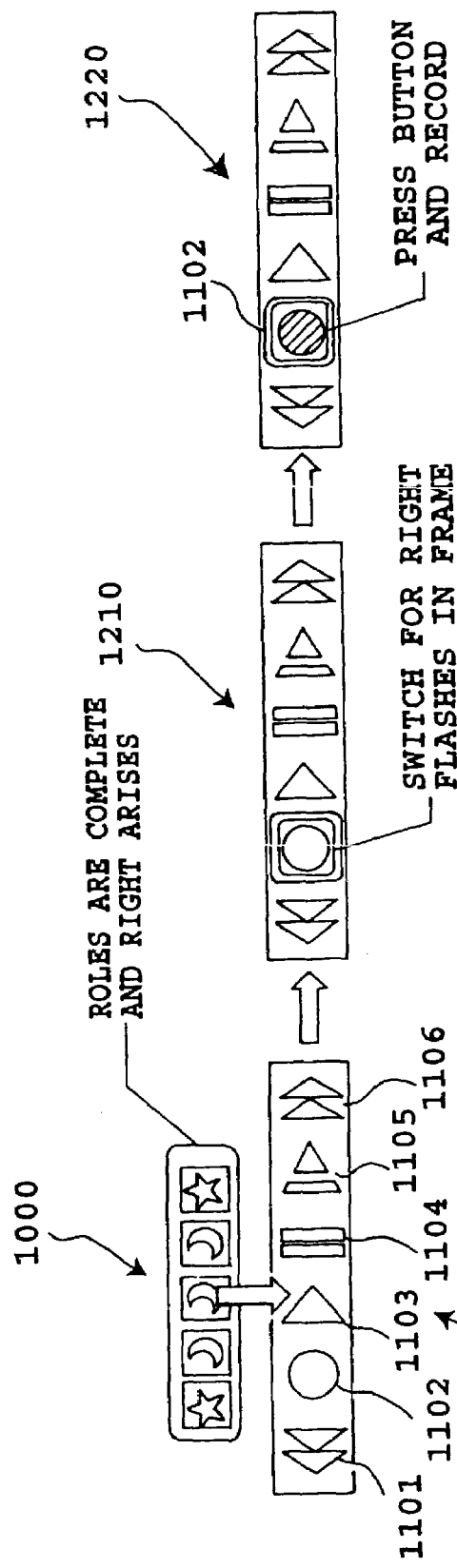
FIG. 5 is an explanatory view showing a certain Change-of-an-Axis-of-Time (CAT) power that has been obtained by virtue of the collected items that appear in the last collections of items display of FIG. 4.

FIG. 5 shows a CAT power display 1200 which is an alternative embodiment of CAT power display 1100 seen in FIG. 3. In FIG. 5, reference numeral 1101–1106 respectively denote the respective symbols for rewind, recording, playback, pause, slow forward, and fast forward. Each such symbol represents a CAT power described below.

As seen by collected items display 1000 in FIG. 5, five (5) items have been collected by game character 1200. These five (5) items can be recognized as the achievement of a specific CAT power by the game. To reflect the achievement of a specific CAT power by game character 1200, the corresponding symbol 1101–1106 in CAT power display 1100 will produce an alternative display, such as a color change and/or a flashing display. The making of such a change is seen in FIG. 5 from reference numeral 1200 to reference numeral 1210, whereby the symbol 1102 for the recording CAT power flashes. If the player operates one of the buttons 136 that corresponds to the recording CAT power from among four buttons 136 for the controller 104, the symbol 1102 is stopped from its alternative display status, and the symbol 1102 is changed in color indicating that the operation of the CAT power is underway as seen by the state of the symbol at reference numeral 1220. By making such a visible display in the scene noticeable to the player, the player will be notified of an achieved CAT power that the player can then activate for an advantageous use of the player-controlled game character 1200 during game play.

In one implementation, if five (5) items are collected by game character 1200, then a lot is drawn. Depending upon the outcome of the drawing of the lot, a CAT power can be achieved according to a combination of the items that were collected and displayed in collected items display 1000. If the drawing of the lot results in a CAT power that is achieved, the symbol corresponding to the CAT power is subjected to the alternative displays thereof as described above upon, respectively, achieving the CAT power and activating the CAT power during game play.

FIG. 6 shows a table. Each row in the table shows five (5) columns of a combination of items that must be collected by game character 1200 in order to achieve the CAT power in the sixth column. Each of the CAT powers, including pause, fast forward, rewind, and record/replay, will now be explained. When a user selects and initiates the operation of any of the CAT powers, including pause, fast forward, slow forward, and recording/playback, the player has the impression from the displayed scene that the game character 1200 is in a time space that is entirely different from everything else in the virtual space of the displayed scene. Stated otherwise, the game character 1200 seems to be moving in the $4^{th}$ dimension in a first axis of time while everything else that is part of the 3D virtual world in the displayed scene (the surroundings of the game character 1200) is moving in the $4^{th}$ dimension in a second axis of time. At the start of the predetermined time of a CAT power operation, the first axis of time for the game character 1200 and the second axis of time for everything else in world of the displayed scene (e.g. the surroundings of game character 1200) are changed so as to be different. The first and second axes of time become the same at the end of the predetermined time.

The pause CAT power, which is reflected in the first two (2) rows of the table of FIG. 6, is the power to pause (i.e. suspend) a scene for a predetermined time. In this example, there is a suspension of time for 5 seconds or 10 seconds when the pause CAT power is exercised. During this predetermined time, the game holds everything in the displayed scene as stationary except for the game character 1200 and the display areas 1000 and 1100. Note that display areas 1000 and 1100 are, respectively, an informational display and a user interface, neither of which are part of the virtual world of game character 1200. During exercise of the pause CAT power, game character 1200 can move about the displayed scene while nothing else in the virtual world appears to be moving. Game character 1200 can collect items (not shown) in the displayed scene, destroy immobile enemies (not shown) in the displayed scene, and/or simply move about the displayed scene. Since any enemy in the scene does not move during the predetermined time that the pause CAT power is active, they are easy prey for game character 1200. For instance, in a displayed scene where a plurality of enemies appear to fight the game character 1200, the player can press one of the buttons 136 of the controller 104 to initiate the pause CAT power that has been achieved through collection of items. The pause CAT power is then activated and everything in the display scene is then suspended in a state of animation for a predetermined time. The player takes advantage of the suspended state of his enemies by operating the sticks 132(1) and 132(2) of the controller 104 to, respectively, view areas of the virtual world in the displayed screen and control the movements of game character 1200 so as to extinguish or destroy as may of the suspended enemies in the displayed screen as possible.

The fast forward CAT power, which is reflected in the $3^{rd}$, $4^{th}$, and $9^{th}$ rows of the table of FIG. 6, is the power to change the rate of the scene so that it is faster in the future direction than the normal display mode. Thus, the displayed scene appears to move faster than normal, with the game character 1200 moving faster than everything in the displayed scene. Two kinds of change rates are provided when the fast forward CAT power is active for a predetermined period of time. The fast forward CAT power is set for a predetermined time after the player depresses one of the buttons 136 on controller 104 to initiate the fast forward CAT power and for which a predetermined time is variably set by a combination of items that were collected by the game character 1200. In the scene where the player knows that there is no item that can be collected, the player can exercise the fast forward CAT power to shorten the physical time until the end of the game or to quickly move the game character into a different displayed scene. If the fast forward CAT power is automatically ended with the elapse of the predetermined time, the player loses the fast forward CAT power, whereby a change of scene causes a return to the display mode where the player has no CAT power that is active. In this implementation, for example, the movement speed of the game character on the display screen is stationary, in other words, irrespective of the change rate of the scene. Note that the change rate of scene is only varied.

The slow forward CAT power, which is not reflected in FIG. 6, is a power for a display mode in which a change of a display rate of the displayed scene is slower in the future direction than that of a normal display mode. The slow forward CAT power is set for a predetermined time after the player selects its function with one of the buttons 136 of controller 104.

The rewind CAT power, which is reflected in the $5^{th}$, $6^{th}$, and $8^{th}$ rows of the table of FIG. 6, is a display mode for rewinding (perform a playback in the reverse direction) a displayed scene until a point in time in the past. If the player activates a rewind CAT power, the scene of the game is displayed backwards, except for game character 1200, for a predetermined time before the present point of time. The game can be resumed at the past point in time in the scene to which the player has transferred. The time dimension of the game character 1200 is unaffected by the rewind CAT power (e.g. irrelevancy as to the time axis of the scene). As such, the game attributes of the game character before transfer of the scene are employed and are not changed to the game attributes in the past. For example, treasures collected by game character 1200 during the predetermined time before activation of the rewind CAT power are not lost during the predetermined time that the rewind CAT power is active. The rewind time is decided by a combination of the collected items that have been collected by the game character 1200. In this implementation, 10 seconds and 15 seconds are the respective predetermined time periods for the rewind time. When exercising the rewind CAT power, the player can collect the items that are forgotten or uncollected by the game character during previous game play.

The recording/playback CAT power is a display mode of storing (recording) continuously the game attributes of the displayed scene, the game attributes of the game character, and the drawing data for displaying the game for a predetermined time, and then playing back the recorded past game contents on the display screen based on the stored data. It is noted here that the game character may be treated as a part of the recorded scene, and the player may not manipulate the game character as the game character is played back as seen in the recorded scene from the past. Rather, a clone of the game character appears in the present time dimension simultaneously with the played back image of game character in the displayed scene. While the recorded game character can not be manipulated by the player, the present time clone of the game character can be manipulated by the player. Accordingly, it is possible to provide a displayed scene that appears to the player as if two game characters were fighting the same enemy at the same time on the displayed screen. The game attributes of the clone game character that can be manipulated by the player are continued from the time immediately before the recording, and if the game character being manipulated by the player collects an item or beats an enemy in a fight, the game attributes of the game character are updated.

The image control process discussed above with respect to FIGS. 1 to 6 will be described below with reference to FIGS. 7 to 12.

Figure 7:
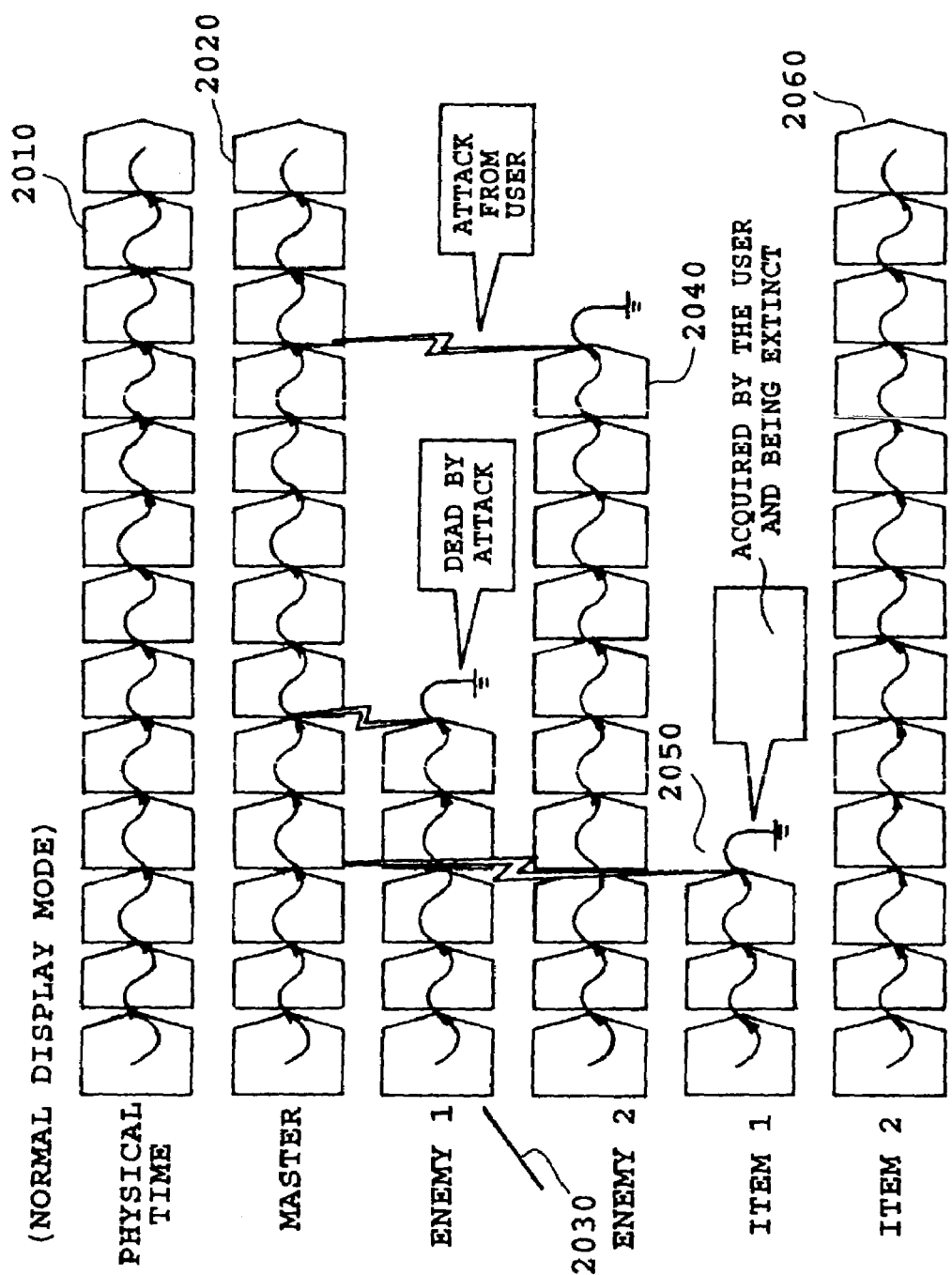
FIG. 7 is a view helpful for explaining a display process in a normal display mode.

A. Normal Display Mode without A CAT Power Being Active: FIG. 7

FIG. 7 shows the contents of game processing in the normal display mode where no CAT power is active. In FIG. 7, the physical time represents the elapsed time from the start of the game (e.g. the real time). Reference numeral 2010 typically denotes an image displayed on the display screen. A plurality of images 2010 are displayed successively on the display. To the eyes of the player, it appears that the game character (seen at "Master" in FIGS. 7–11) and its surroundings (enemies, various items, scenery in FIGS. 7–12) are moving in the displayed virtual 3D world. Reference numeral 2020 denotes an image of the game character moving by a manipulation of the player. Reference numerals 2030 and 2040 respectively denote the images of two different characters that are not controlled by the player, for instance two enemies. Reference numerals 2050 and 2060 respectively denote the images of two different items in the displayed scene that are to be collected by the game character. The images that are synthesized by operation of the game are the image 2020 of the game character and the images 2030 through 2060, respectively, of enemies and items, as well as the background (scenery that is not shown in FIG. 7) of the displayed virtual 3D world. Following synthesis of these images, a synthesized display image 2010 is then created by the 3D graphics processing unit 220 and is displayed on the display in accordance with a display cycle. If enemy 1 dies, such as by being attacked by the game character in a fight, the image of enemy 1 is not synthesized in a subsequent synthesized scene but is rather extinguished from the display screen and is not produced after that. Likewise, if the item 1 is collected by the game character, the image of the item 1 is not synthesized in a subsequent synthesized scene but is rather extinguished from the display screen and is not produced after that. An extinguishment of item 1 is indicated in FIG. 7 by the grounding symbol extending from the last image of item 1 in the row.

Each of FIGS. 7–12 can be understood as featuring images of first and second objects. The first object is represented as a game character that is controlled by the player and the second object is represented as first and second enemies that are not controlled by the player as well as first and second items. Also in each of FIGS. 7–12 there is an initial display of original images of the first object chronologically forward while displaying original images of the second object chronologically forward along the same axis of time. With respect to FIGS. 8–12, the same parts as set forth in the normal display mode of FIG. 7 are not described, and only the different parts thereof are described below.

Figure 8:
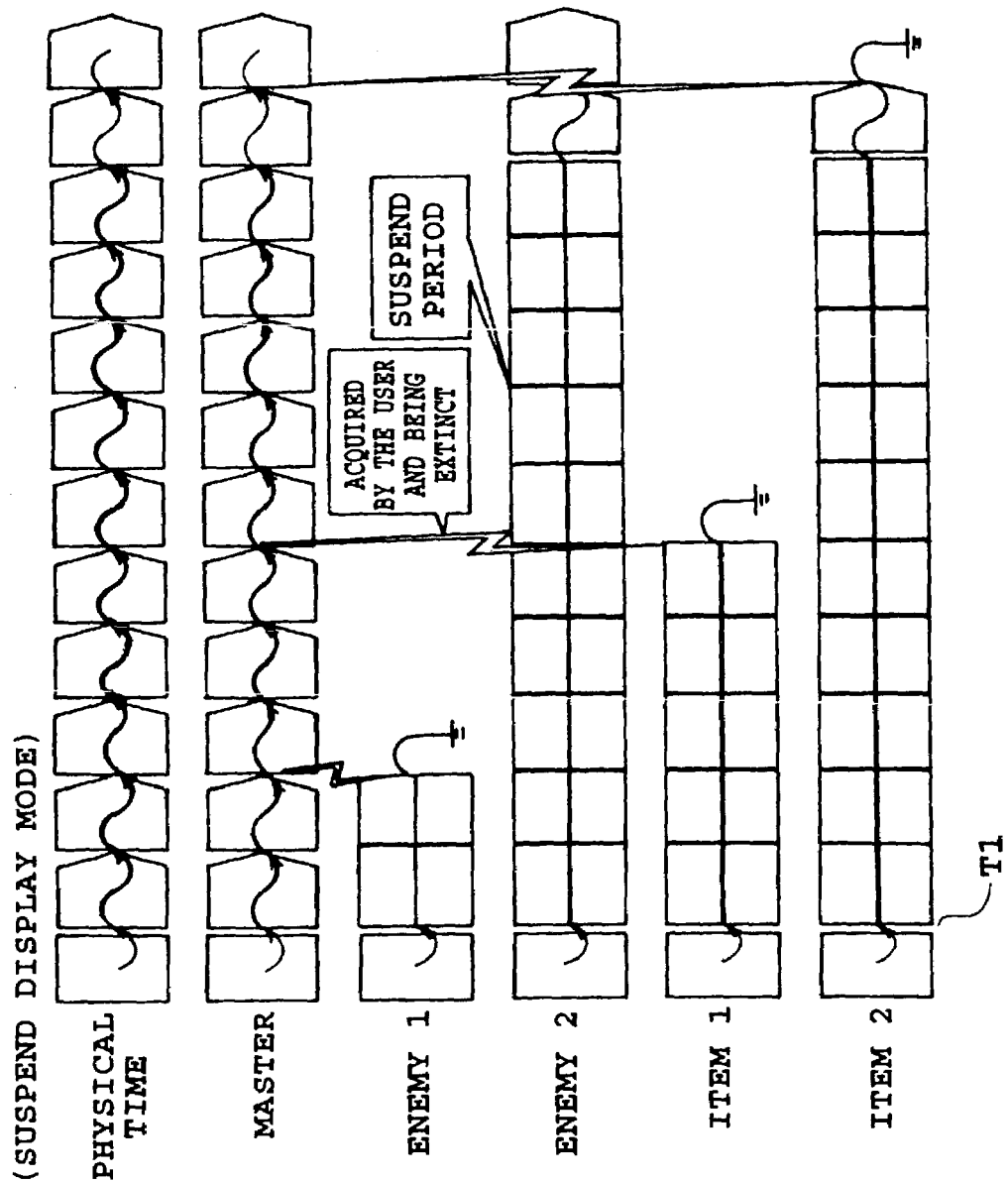
FIG. 8 is a view helpful for explaining a display process in a pause CAT power.

B. Pause CAT Power: FIG. 8

In FIG. 8, the images of the enemies 1, 2 and the items 1, 2 are exactly the images at a point of time T1 when the player initiates the pause CAT power, and thereafter employed for repetitive display. This is represented by rectangular frames in FIG. 8 which are intended to indicate that everything in the displayed screen is in a suspended display mode with the exception for the game character. As such, the game character can move through its surroundings on the display screen by manipulation of the player, and the image of the game character is produced in succession in synchronism with the display cycle. As seen in FIG. 8, the player plays the game by manipulating the game character so as to collect and extinguish from the display both the items 1 and 2, and so as to extinguish enemy 1 during a predetermined time that the pause CAT power is active. Accordingly, items I and 2 are collected by the game character when the pause CAT power is active. The respective images of collected items 1 and 2 are thereafter neither synthesized nor produced for the subsequent displayed scenes, but rather are extinguished from the displayed screens, as seen in FIG. 8.

To initiate the pause CAT power, an input is received from a user to control an action of the first object that satisfies a game condition. As discussed above, the game condition can be achieved by the collection of certain items by the game character (e.g. the first object). A review of FIG. 8 shows that, after the satisfaction of the game condition, additional input is received from the player at time T1 to initiate a predetermined time period during which the pause CAT power is activate. During the predetermined time period, original images of the first object are displayed chronologically forward while there is a replay of a single previously displayed image of the second object. It is further seen from FIG. 8 that the original images of first object are displayed at a first rate of display while the single previously displayed image of the second object is displayed at a second rate of display, where the first rate of display is equal to the second rate of display.

During the predetermined time period, input is received from the player to perform an action with the first object upon the second object to eliminate any display of any image of the second object. FIG. 8 illustrates this action by death of enemy 1 and extinction of hayes 22 item 1. After the death and extinction, the original images of the first object are displayed chronologically forward without any display of any image of the second object.

When the player activates the pause CAT power, a change is made to the rate at which a player-controlled game character (Master in FIG. 8) is rendered with respect to the rate at which the character's surroundings (enemies 1–2 and items 1–2 in FIG. 8) are rendered. This change gives the player the visual appearance that the time dimension of the player-controlled game character is different than time dimension of the character's surroundings.

Figure 9:
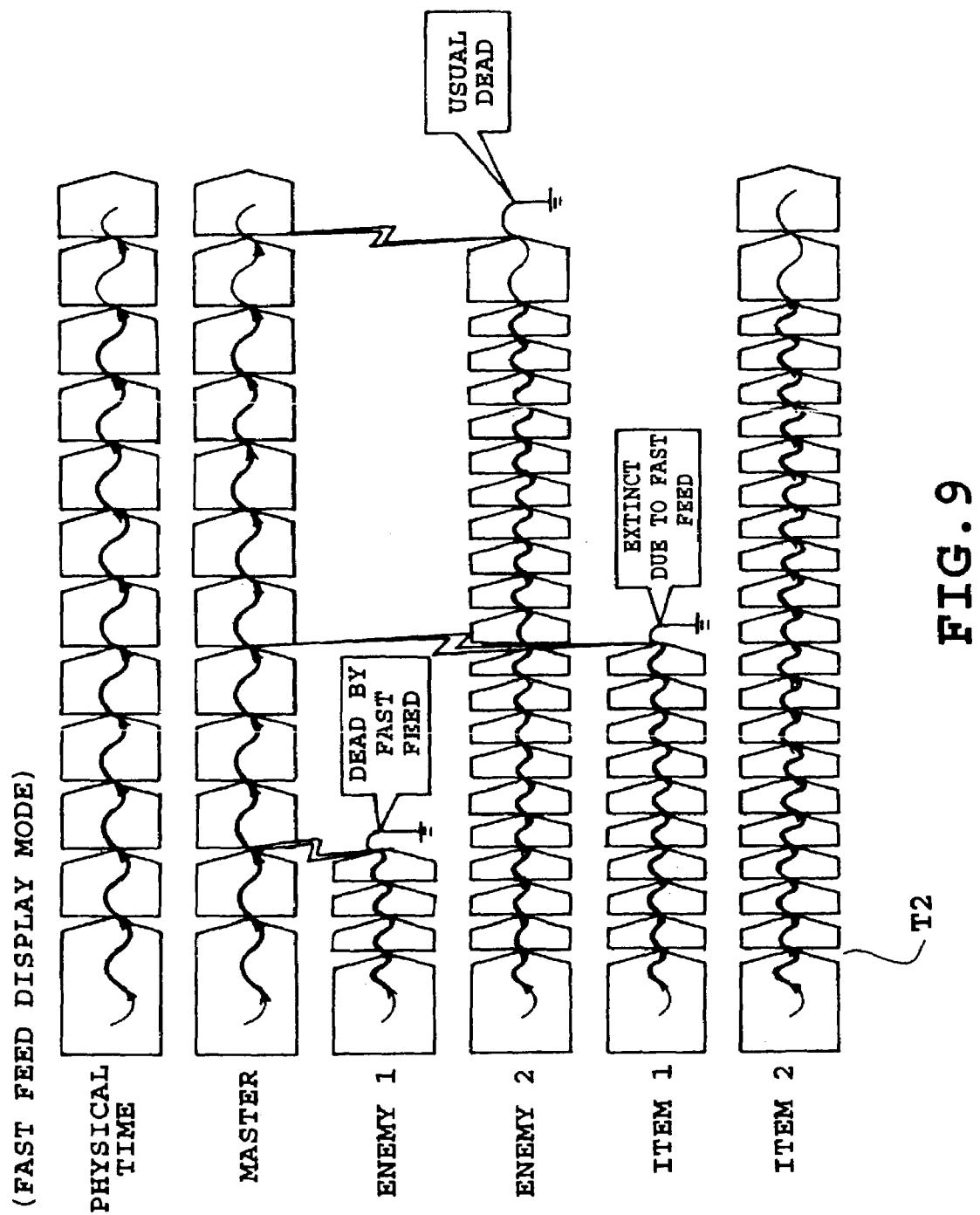
FIG. 9 is a view helpful for explaining a display process in a fast forward CAT power.

C. Fast Forward CAT Power: FIG. 9

In FIG. 9, the images of the enemies 1, 2 and the items 1, 2 are produced visibly at a higher rate in the display cycle from a point of time T2 when the player initiates the fast forward CAT power. Therefore, to affect the fast forward CAT power at a double rate of the display cycle, for example, the image displayed in the normal display mode is produced at every other cycle, thereby giving the impression of the fast forward display mode. The image of the game character is produced at the same rate as in the normal display mode. As such, the rendering of the physical time display in FIG. 9 past time T2 will include only one (1) image of the game character while including two (2) images for each non-extinguished enemies 1 and 2 and for each non-extinguished items 1 and 2. Thereby, the player can play the game by manipulating the game character, including collection of items and extinguishing enemies in the displayed scene, even when the fast forward CAT power is active. FIG. 9 shows the game character killing enemy 1 and collecting item 1 during the fast forward CAT power, and then killing enemy 2 after the fast forward CAT power is over. In can be seen from the fast forward display mode illustrated in FIG. 9 that the fast forward CAT power changes the time axis in which the game character moves by a factor two from the different time axis movement of the enemies 1 and 2 and the items 1 and 2.

A review of FIG. 9 shows that there is an initial display of images of the first object at a first rate of display while displaying images of the second object at a second rate of display that is equal to the first rate of display. To initiate the Fast Forward CAT Power, an input is received from a user to control an action of the first object that satisfies a game condition. As discussed above, the game condition can be a collection of certain items by the game character (e.g. the first object). After the satisfaction of the game condition, additional input is received from the player at time T2 to initiate a predetermined time period during which the Fast Forward CAT power is activate. During the predetermined time period there is a display of the images of the first object at the first rate of display while displaying images of the second object at a third rate of display that is visibly different than the first rate of display. Also during the predetermined time period an action is performed with the first object that being displayed at the first rate of display upon the second object being displayed at the third rate of display. The result of the action is an elimination of any display of any image of the second object. This elimination is seen in FIG. 9 as the death of both enemies 1 and 2 and as the extinction of item 1. After the predetermined time period, there is a displaying of images of the first object at the first rate of display while there is no display of any image of the second object. FIG. 9 shows that while the Fast Forward CAT Power is activated, the third rate of display is greater than the first rate of display.

In another implementation of the fast forward CAT power, both the physical time and the player-controlled game character move in time in the same dimension, while the surroundings of the game character move in a relatively slower dimension of time. In this implementation of the fast forward CAT power, FIG. 9 would match FIG. 10. such that the game character (Master) is rendered more often than its surroundings (e.g. everything else) and the physical time is matched with the timing of the Master.

Figure 10:
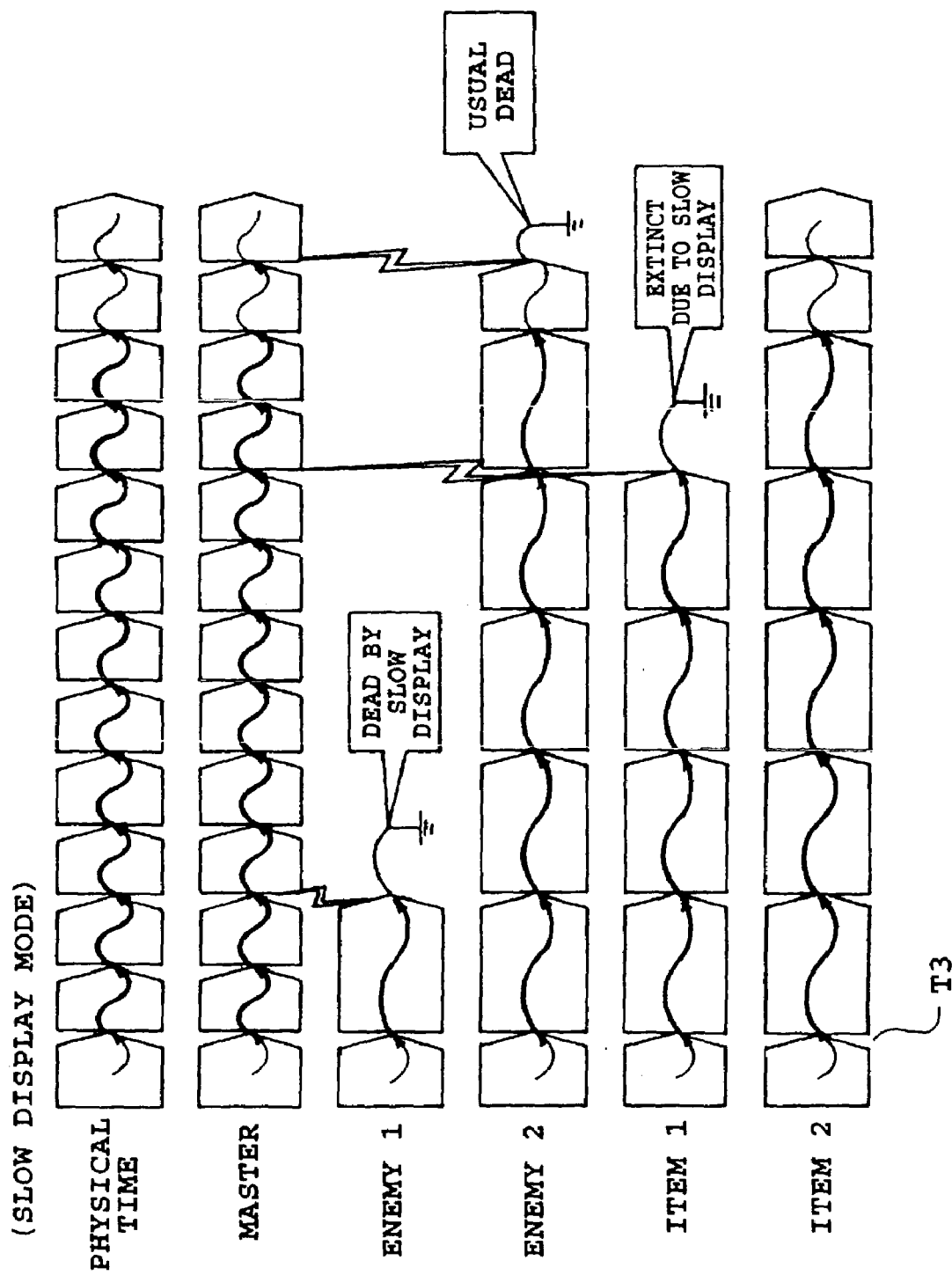
FIG. 10 is a view helpful for explaining a display process in a slow forward CAT power.

D. Slow Forward CAT Power: FIG. 10

FIG. 10 shows a slow display mode for activation of a slow forward CAT power. In the illustration of the slow forward CAT power, the images of the enemies 1, 2 and the items 1, 2 are produced at a lower rate than the image of the game character in the rendered display cycle. This change in the axis of time begins at a point of time T3 when the player initiates the slow forward CAT power. To give the impression of the slow forward display at a half rate of the display cycle, which is illustrated in FIG. 10 as an example, the same image displayed in the normal mode may be produced twice and used for display, or the image produced firstly maybe also used secondly. The image of the game character is produced at the same rate as in the normal display mode. As such, the rendering of the physical time display in FIG. 10 past time T3 will include two (2) images of the game character while including only one-half (½) of an image for each of the non-extinguished enemies 1 and 2 and for each of the non-extinguished items 1 and 2. Thereby, the player can play the game by manipulating the game character, including collection of items and extinguishing enemies in the displayed scene, even when the slow forward CAT power is active. FIG. 10 shows the game character killing enemy 1 and collecting item 1 during the slow forward CAT power, and then killing enemy 2 after the slow forward CAT power is no longer active. In can be seen from the slow forward display mode illustrated in FIG. 10 that the slow forward CAT power changes the time axis in which the game character moves by a factor two from the different time axis movement of the enemies 1 and 2 and the items 1 and 2.

A review of FIG. 10 shows that there is an initial display of images of the first object at a first rate of display while displaying images of the second object at a second rate of display that is equal to the first rate of display. To initiate the Slow Forward CAT Power, an input is received from a user to control an action of the first object that satisfies a game condition. As discussed above, the game condition can be a collection of certain items by the game character (e.g. the first object). After the satisfaction of the game condition, additional input is received from the player at time T3 to initiate a predetermined time period during which the Slow Forward CAT power is activate. During the predetermined time period there is a display of the images of the first object at the first rate of display while displaying images of the second object at a third rate of display that is visibly different than the first rate of display. Also during the predetermined time period an action is performed with the first object that being displayed at the first rate of display upon the second object being displayed at the third rate of display. The result of the action is an elimination of any display of any image of the second object. This elimination is seen in FIG. 10 as the death of both enemies 1 and 2 and as the extinction of item 1. After the predetermined time period, there is a displaying of images of the first object at the first rate of display while there is no display of any image of the second object. FIG. 10 shows that while the Slow Forward CAT Power is activate, the third rate of display is less than the first rate of display.

In sum, the visual appearance of the slow and fast forward CAT powers is that the character and the character's surroundings are both moving in the same direction in time but at different rates.

Figure 11:
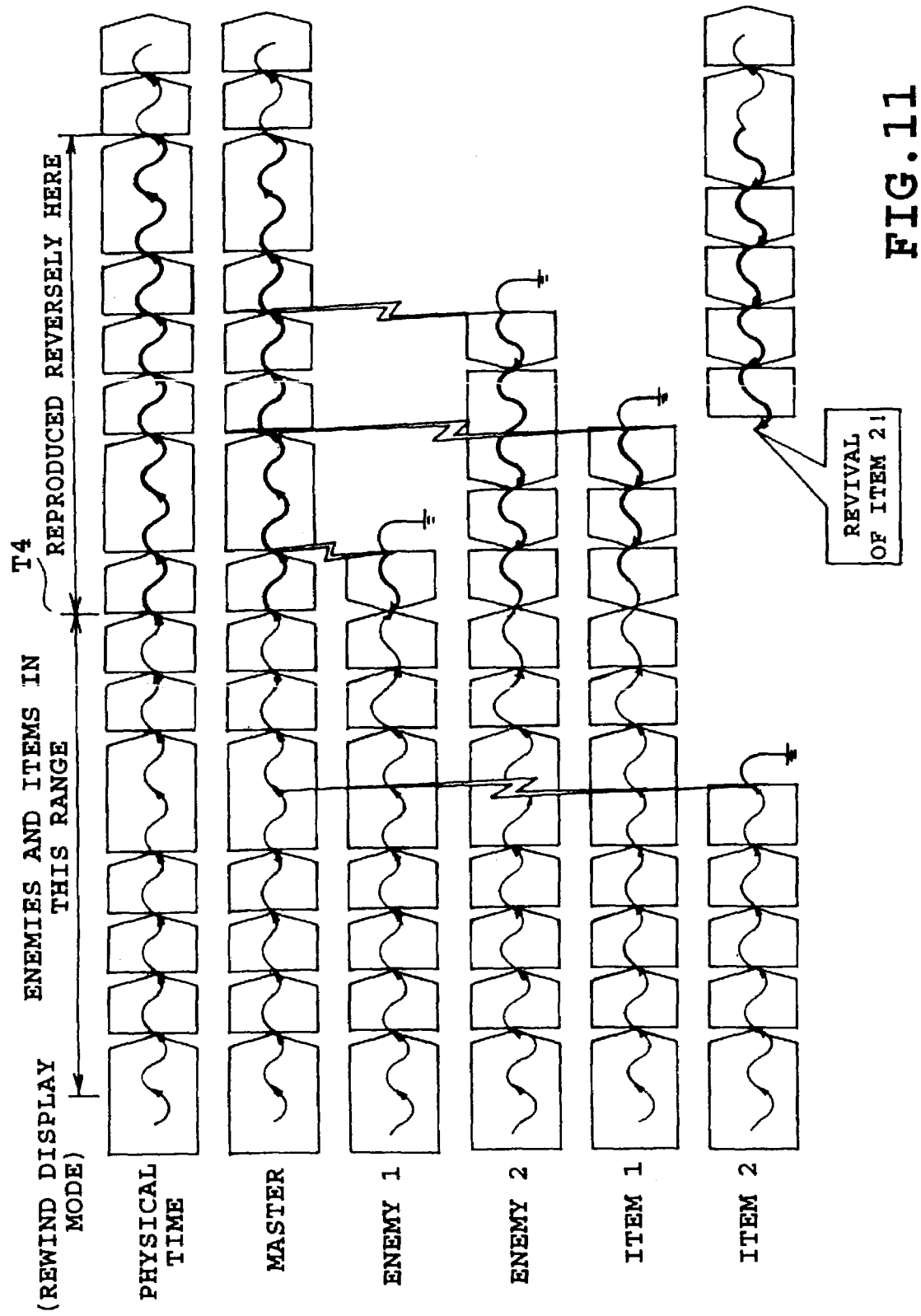
FIG. 11 is a view helpful for explaining a display process in a rewind CAT power.

E. Rewind CAT Power: FIG. 11

FIG. 11 shows a rewind display mode for activation of a rewind CAT power. In FIG. 11, the images of the enemies 1, 2 and the items 1, 2 are produced while going backward from a point of time T4 when the player activates the rewind CAT power. These images and the image of the game character are produced in synchronism with the display cycle and are synthesized and displayed. Accordingly, the item 2 collected in the past and extinguished from the display screen is produced again as it is revived and displayed. The rewind CAT power can be used to revive an extinguished enemy so that the revived enemy will appear again. Thereby, the player can play the game by manipulating the game character to collect the items and extinguish the enemy even when the rewind CAT power is active. It is seen from the forward blocks and from the reversed blocks in FIG. 11 that the images of the enemies and the images of the items are rendered in reverse order from time T4 so as to appear on the display scene to be going backwards in time during the rewind CAT power. Conversely, as is also seen in FIG. 11, the image of the game character is not rendered in reverse order during the rewind CAT power.

A review of FIG. 11 shows that there is an initial display of original images of the first object chronologically forward while there is also a display of original images of the second object chronologically forward. Input is received from a user to control an action of the first object that satisfies a game condition. As discussed above, the game condition can be a collection of certain items by the game character (e.g. the first object). After the satisfaction of the game condition, additional input is received from the player at time T4 to initiate a predetermined time period during which the Rewind CAT power is activated. During the predetermined time period there is a display of original images of the first object chronologically forward while there is a replay of the previously displayed images of the second object chronologically backward. The previously displayed images of the second object can be stored as appropriate in the hard disk drive 208 and/or in the RAM memory 206. FIG. 11 shows that the first object is displayed at a first rate of display and the second object is displayed at a second rate of display, and that the first rate of display is visibly similar to the second rate of display.

Also seen in FIG. 11 is the elimination of the second object as seen in the death of enemies 1 and 2 and the extinction of items 1 and 2. Item 2, however, is revived during the rewind portion of the rewind CAT power. As can be seen from FIG. 11, these deaths and extinctions are the result of input received from a user to perform an action with the first object upon the second object to eliminate the display of the images of the second object. After these deaths and extinctions there remains a display of original images of the first object chronologically forward. Additional input is received from the player at time T4 to initiate a predetermined time period during which there is a display of original images of the first object chronologically forward while replaying previously displayed images of the second object chronologically backward including the previously displayed images of the second object that were displayed during and chronologically prior to the elimination of the display of the images of the second object (e.g. the revival of item 2). It can also be seen from FIG. 11 that, after the predetermined time period has expired, there is a display of original images of the first object chronologically forward while there is also a display of original images of the second object chronologically forward (e.g. item 2 is displayed chronologically forward).

In sum, the visual appearance of the rewind CAT power is that the game character and its surroundings move in opposing directions in time. For instance, the game character can be moving forward in time while the game character's surroundings are moving backwards in time.

Figure 12:
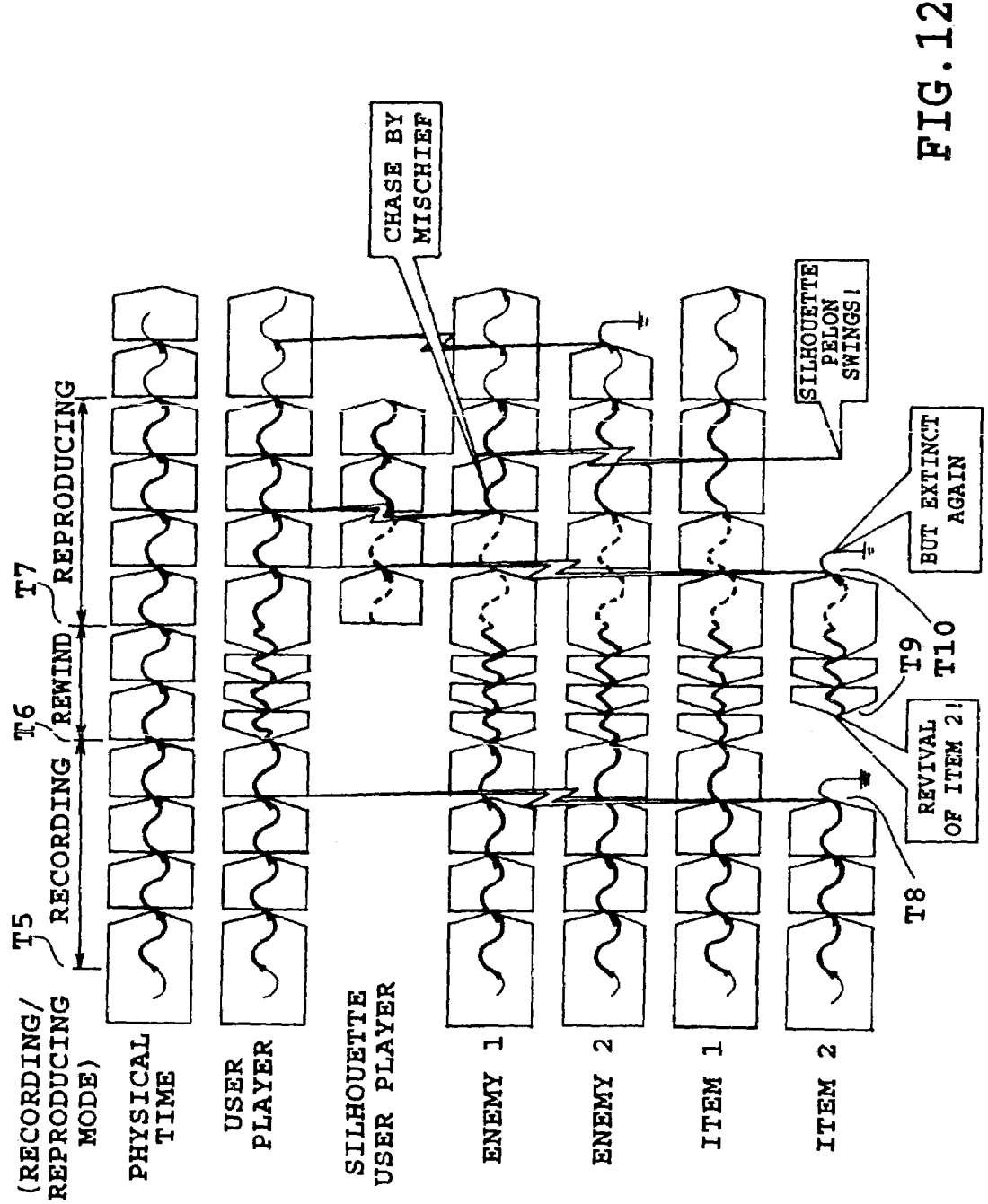
FIG. 12 is a view helpful for explaining a display process in a recording/playback CAT power.

F. Recording/Playback CAT Power: FIG. 12

In FIG. 12, all the game attributes for use with the game, for example, a scene number, attributes of the game character, attributes of enemies, identification numbers for background images, input data from the controller 104, and other game attributes, are stored in the RAM memory 206 for a predetermined time from a point of time T5 when the player initiates the recording/playback CAT power. Optionally, storage can be appropriated in the hard disk drive 208 instead of the RAM memory 206. The CPU 200 measures the predetermined time, and performs rewinding at time T7 to time T6, employing the game attributes stored for the purpose of recording, after the elapse of the predetermined time. The rewind speed at this time is faster than in the rewind process of the rewind CAT power as above described. If the rewind is stopped at the recording start point at time T5, the CPU 200 reproduces and displays the game from its point of time T7, using the game attributes stored for the purpose of recording.

FIG. 12 depicts renderings of a user player which is a present-time player-controlled game character, a silhouette user player which is a playback of a recording of the player-controlled game character, enemies 1 and 2, and items 1 and 2. Accordingly, two game characters are displayed on the display screen during the playback portion of the activate recording/playback CAT power. These two game characters are the player-controlled game character (a clone) and a silhouette of the previously recorded game character that can not be manipulated by the player. It is seen from the forward and reversed blocks in FIG. 12 that all of the images on the display screen are rendered in reverse order from time T6 to time T7 so as to appear to be going backwards in time during the rewind portion of the record/playback CAT power. Then, at time T7, the previously recorded game character appears as a silhouette form in the displayed scene while the player-manipulated game character appears as a clone that moves forward in time. The rewind CAT power can be distinguished from the rewind portion of the recording/playback CAT power in that the former does not display the game character in reverse order whereas the latter displays the "User Player" (the clone of the silhouette) in reverse order.

During the recording portion of the recording/playback CAT power, the game character can collect an item at a point of time T8. If the item disappears from the display screen by virtual of its collection, the item will appear again on the display screen at a point of time T9 by revival due to the rewinding portion of the recording/playback CAT power, and the item will then disappear again by extinguishment at a point of time T10 during the playback portion of the activate recording/playback CAT power. The present-time game character that the game permits to be manipulated by the player keeps its game attributes, e.g. the items that were collected by the game character, at the point of time T6 when the recording is ended, even during both the rewinding and the playback portions of the recording/playback CAT power. In game play rules, the number of collected items can be increased by collecting the items that appear again in the displayed scene.

A review of FIG. 12 shows that there is a display of original images of the first object (e.g. the game character that can be manipulated by the player) that is chronologically forward while there is also a display of original images of the second object that is chronologically forward (e.g. enemies 1–2, items 1–2). Input is received from the player to control an action of the first object that satisfies a game condition. As discussed above, the game condition can be a collection of certain items by the player's manipulation of the game character (e.g. the first object). After the satisfaction of the game condition, additional input is received from the player at time T5 to initiate a predetermined time period during which the record portion of the recording/playback CAT power is active. After record portion, beginning at time T6, there is a display of a replay of the previously displayed original images of the first object that is chronologically backward while there is also a display of a replay of the previously displayed original images of the second object that is chronologically backward. Thus, in effect, the recorded portion of the images of first and second objects is played backwards from time T6 to time T7. After the recorded portion is played backwards, at time T7, there is a display of a replay of the previously displayed original images of the first object that is chronologically forward. Also beginning at time T7 there is a display of a replay of the previously displayed original images of the second object that is chronologically forward as well as a display of original images of another one of the first object that is also chronologically forward. The display of the other one of the first objects is visibly different (e.g. silhouette) from the originally displayed first object so as to be distinguishable.

Following the chronologically forward replay of the recorded portion, FIG. 12 shows the first object and those second objects that are not in a state of extinction as being displayed chronologically forward as original images. Thus, as seen in FIG. 12 after the forward replay portion, the silhouette user player is eliminated from the display as it was embodied only in the recorded portion and item 2 remains in the extinguished state. As described above, the extinction of the second object is a function of receiving input from the player to perform an action with the first object upon the second object to eliminate any display of any image of the second object. As seen at time T8, item 2 has been eliminated by the game character after which there is a displaying of original images of the first object chronologically forward and there is no display of any image of item 2. This elimination of item 2 is recorded from time T5 through time T6. During the chronologically backward replay of the recorded portion, there is a displaying of the chronological elimination and revival of item 2 from its previously displayed original images that were in the recording. At time T10, as the recording is replayed chronologically forward, item 2 is again displayed as it is eliminated from the recording thereof. After time T10, there is a display of original images of the first object chronologically forward without displaying any image of item 2.

Figure 13:
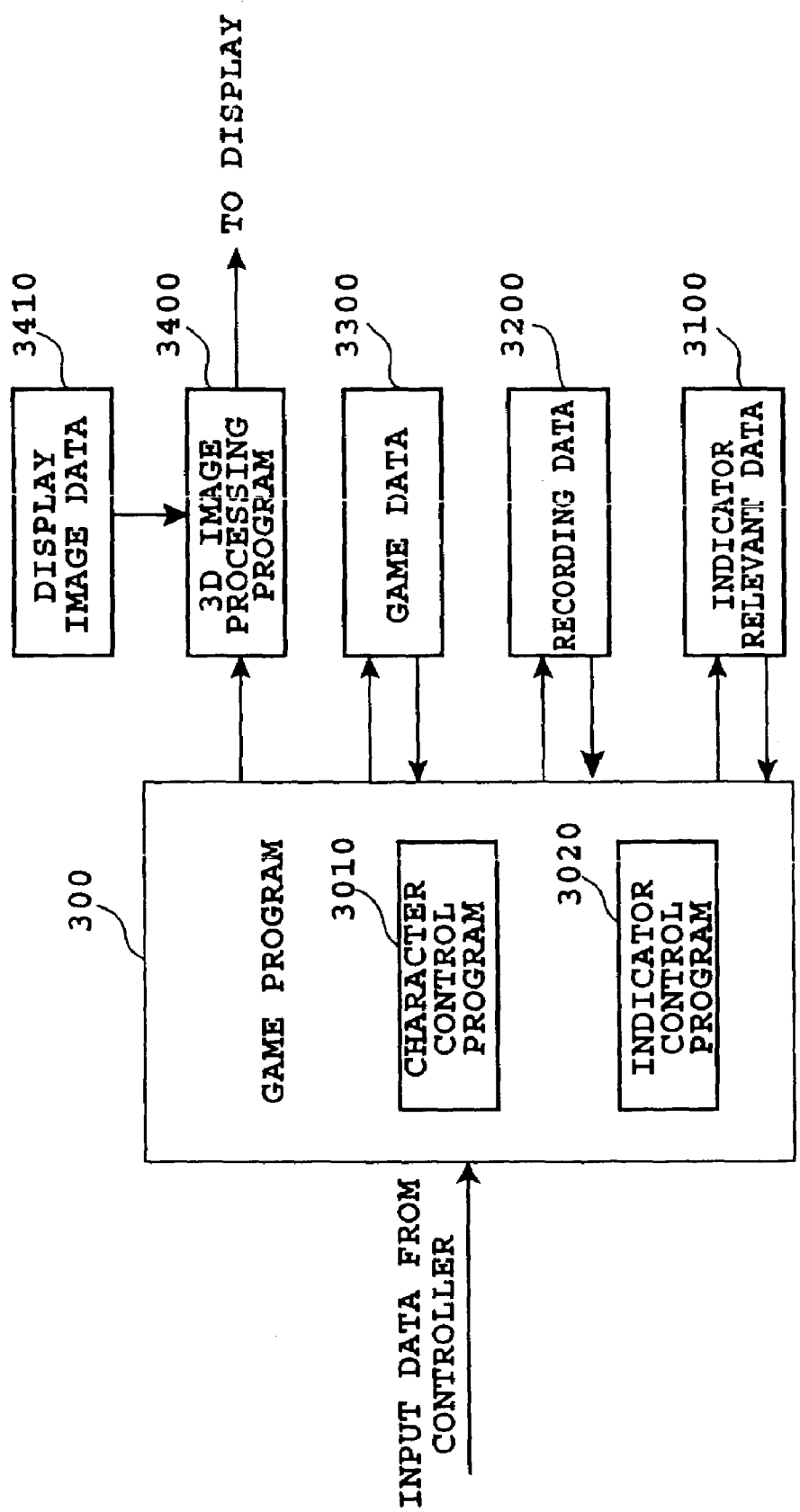
FIG. 13 is a block diagram showing a software configuration of the game machine of FIGS. 1–2.

Referring to FIG. 13, a software configuration for implementing a game process will be described below. In FIG. 13, reference numeral 300 denotes a game program. The game program is transferred, through the communication or through a storage medium to the hard disk drive 208 or to the RAM memory 206, to a game machine from one or more external sources. In the case where the game program is transferred to the hard disk drive 208 for the game machine from the external, the game program 300 is loaded into the RAM memory 206 and executed by the CPU 200. Reference numeral 3010 denotes a character control program for controlling the game attributes of the game character. In this implementation, everything that is displayed in the scene (consisting of the background, enemies, and items) and the game attributes are moved backwards in time, as described above with respect to the rewind CAT power, with the exception of the game character that is not rendered in the displayed scene by any backward movement in time. The character control program 3010 may be defined by a function if the game program is created in C language, for example.

Reference numeral 3020 denotes a program (generically referred to as an indicator) for controlling an image displayed in a display area of the display scene. By way of example, program 3020 performs the generation of the collected items display 1000 and the CAT power display 1100 in FIG. 3, respectively referred to herein elsewhere as the image for informing the collected items and the display mode. The indicator for program 3020 maybe also defined by a function.

Reference numeral 3100 denotes the indicator associated data. The indicator associated data 3100 includes the items (as referenced by a respective identification number for each item) that were collected by the game character during game play, the display mode that is set presently (e.g. normal display mode, rewind CAT power, pause CAT power, fast forward CAT power, slow forward CAT power, record/playback CAT power), and flag information indicating whether or not certain indicators are currently displayed on the display screen. The indicator associated data 3100 is stored in the RAM memory 206.

Reference numeral 3200 denotes storage for the game attributes (recording data) that were stored during activation of the recording/playback mode for the recording/playback CAT power. The recording data 3200 may be stored in the RAM memory 206 or in the hard disk drive 208.

Reference numeral 3300 denotes the game data. The game data 3300 includes the game attributes and a table containing the identification numbers of the images to be displayed on the scene for display, for example, the images of the background, the collected items, the game character, and other enemies. The game data 3300 also includes another table showing the scene to be displayed in progress of the game. The game attributes as described above have the attributes inconformity with the game contents, including the attributes associated with the game character (e.g., attributes that indicate the number of collected items, attributes that represent the strength of game character, etc.), other attributes (e.g. attributes representing the strength of one or more of the enemies, and attributes indicating whether the enemy is extinct or not), and the attributes indicating the present scene of the game. The game data 3300 may have a variety of different game contents as is conventional. Hence, the detailed description of the game data 3300 is omitted.

Reference numeral 3400 denotes a 3D image processing program. The 3D image processing program 3400 is executed by the 3D graphics processing unit 220 (e.g. by an information processor within the 3D graphics processing unit 220). The 3D image program 3400 produces a 3D image to be displayed on a display, using the image data for display stored in either the hard disk drive 208 or the RAM memory 206, or both. The produced image is passed to the display in synchronism with the display cycle of the display, and displayed on a display screen. The 3D image processing program 3400 is well known. Hence, the detailed description of the 3D image processing program 3400 is omitted.

Reference numeral 3410 denotes the image data for display that are stored in either the hard disk drive 208 or the RAM memory 206, or both. The image data for display is installed together with the game program 300 into either the hard disk drive 208 or the RAM memory 206, or both. The image data for display include the drawing data (e.g. polygon data) for producing various images useful to display, the texture data, and indicator data for the indicator as was described above with respect to program 3020.

The information for game processing is sent or received between the above programs 3010, 3020, and 3400. The information for game processing as referred to in this implementation include a processing for inputting an instruction received from the player from the controller 104 into game program 300, a processing for changing the attribute or display position of the game character in response to the instruction received from the player, a processing for displaying enemies and the items on the display screen on the basis of the game attributes prepared, a processing for deleting enemies and items from the display screen, and a processing for displaying the game condition for the indicator as was described above with respect to program 3020.

The information for game processing is sent or received via the RAM memory 206. For instance, to enable the CPU 200 to instruct the display position of the game character, an area for storing the display position (what is called a storage area dealing with the variables at the display position) is provided on the RAM memory 206, whereby the CPU 200 writes the data indicating the display position into this storage area, and reads the data indicating the display position from this storage area to transfer the information.

With respect to and consideration of the foregoing, the game process to be executed by the CPU 200 and the 3D graphics processing unit 220 will be described below with reference to FIGS. 14 to 19.

Figure 14:
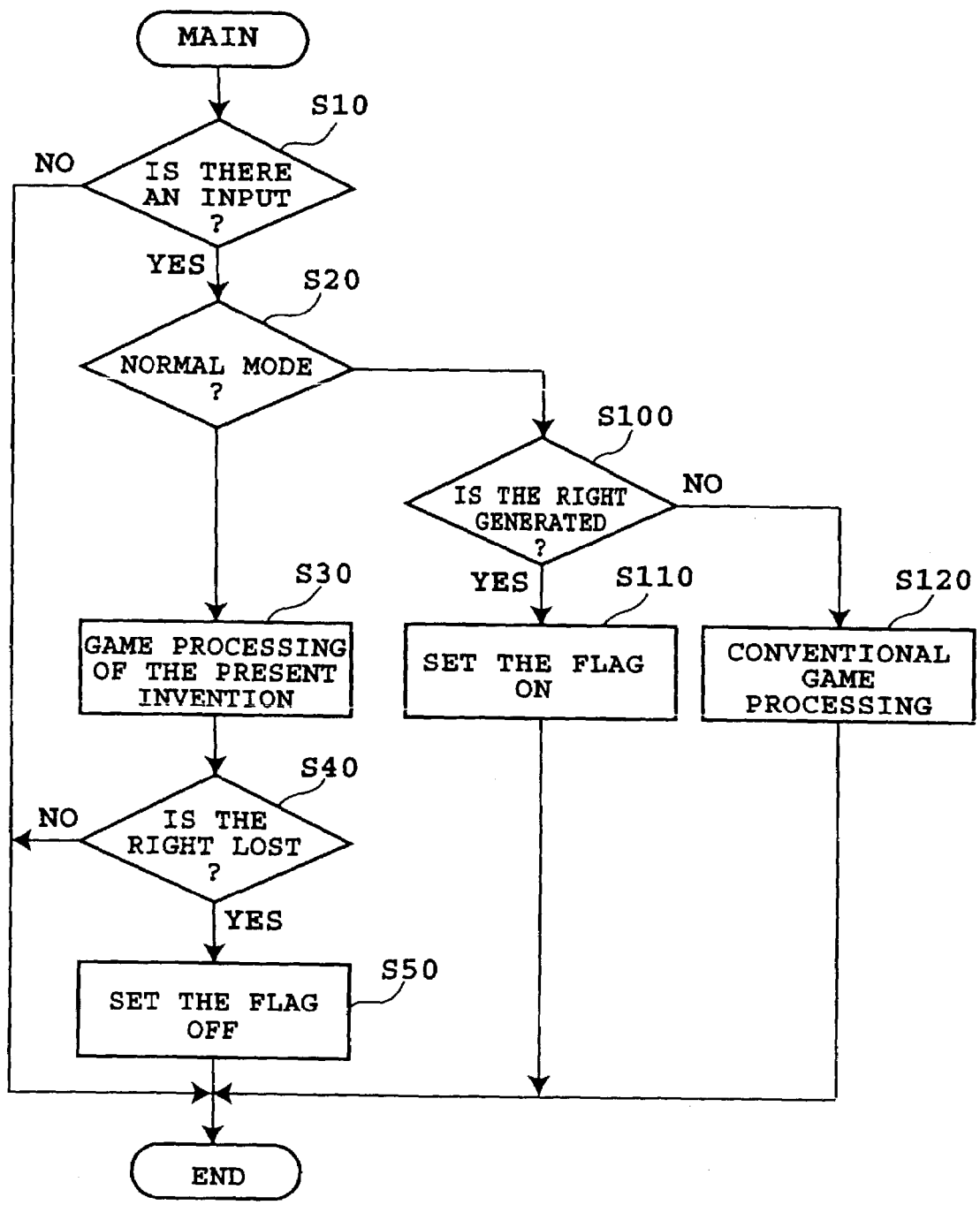
FIG. 14 is a flowchart showing a main processing procedure that is performed by a central processing unit (CPU)

FIG. 14 shows a main processing procedure of the game program 300 that is performed by the CPU 200. In FIG. 14, if the CPU 200 detects an input from the controller 104 (YES determination at block S10), it is determined whether the present game processing mode is a display mode corresponding to an activated CAT power for performing the game processing of enemies along a second time axis that is different from a first time axis of the game character using the game attributes of the enemies, or whether the present game processing mode is a normal display mode (e.g. a CAT power is not activated) for performing the game processing along the first time axis of the game character using the game attributes of the game character (block S20).

If the normal display mode is set, it is determined whether or not the data input from the controller 104 satisfies a transfer condition to a particular CAT power (from block S20 to block S100). In this implementation, a check is made as to whether or not five (5) items have been collected. If the input data from the controller 104 is the data indicating the collection of items, and the number of collected items before the input of data is four (4) items, the determination result of block S100 satisfies the transfer condition because the number of collected items now has reached the prerequisite of five (5) so as to satisfy the transfer condition, then the CAT power flag is set on (block S110). Here, the satisfaction of the transfer condition is intended to mean the earning of a particular CAT power that can be activated as a display mode by the player as was previously described.

On the other hand, if the input from the controller 104 is irrelevant to the collection of items, the game processing in the normal display mode is performed. As such, the game processing for the normal display mode as seen FIG. 7 is executed by the CPU 200 using the attributes of the game character and other game attributes along the same time axis (from block S100 to block S120).

In the game processing, the game attributes of the game character are controlled by the character control program 3010. In this implementation, the game processing is performed in which the game character is moved on the display screen, or fights with an enemy, for example. In this game processing, the character control program 3010 compares the game attribute regarding the strength of the game character and the game attribute regarding the strength of the enemy, in which if the value of attribute of the game character is greater, the game character beats the enemy, and the game attribute regarding the strength of the game character is updated. It is noted that the game attributes of the scene used for this comparison are obtained from the scene set automatically by the game program 300, and are used in the game processing along the first time axis.

In this implementation, the processing procedure from block S10 to block S20 to block S100 to block S120 is repeated until the game character collects five (5) items. When the game character collects the fifth item, the CAT power flag is set on (from block S10 to block S100 to block S110). Thereafter, if there is any input from the controller 104, the procedure proceeds from block S10 to block S20 to block S30 to perform the game processing with respect to the CAT power described above with respect to FIGS. 8 to 12. While the player possesses the CAT power, the procedure is repeated from block S10 to block S20 to block S30 to block S40 to the end block of FIG. 14. At block S40, it is determined whether or not the player has lost the benefit of the CAT power. If the player has lost the CAT power, namely due to the elapsing of the predetermined time allotted for the particular CAT power, or the game character manipulated by the player in the CAT power beats the enemy in this implementation, the CAT power flag is set off (from block S40 to block S50). Thereby, the procedure transfers back into the normal display mode as described above with respect to FIG. 7.

Figure 15:
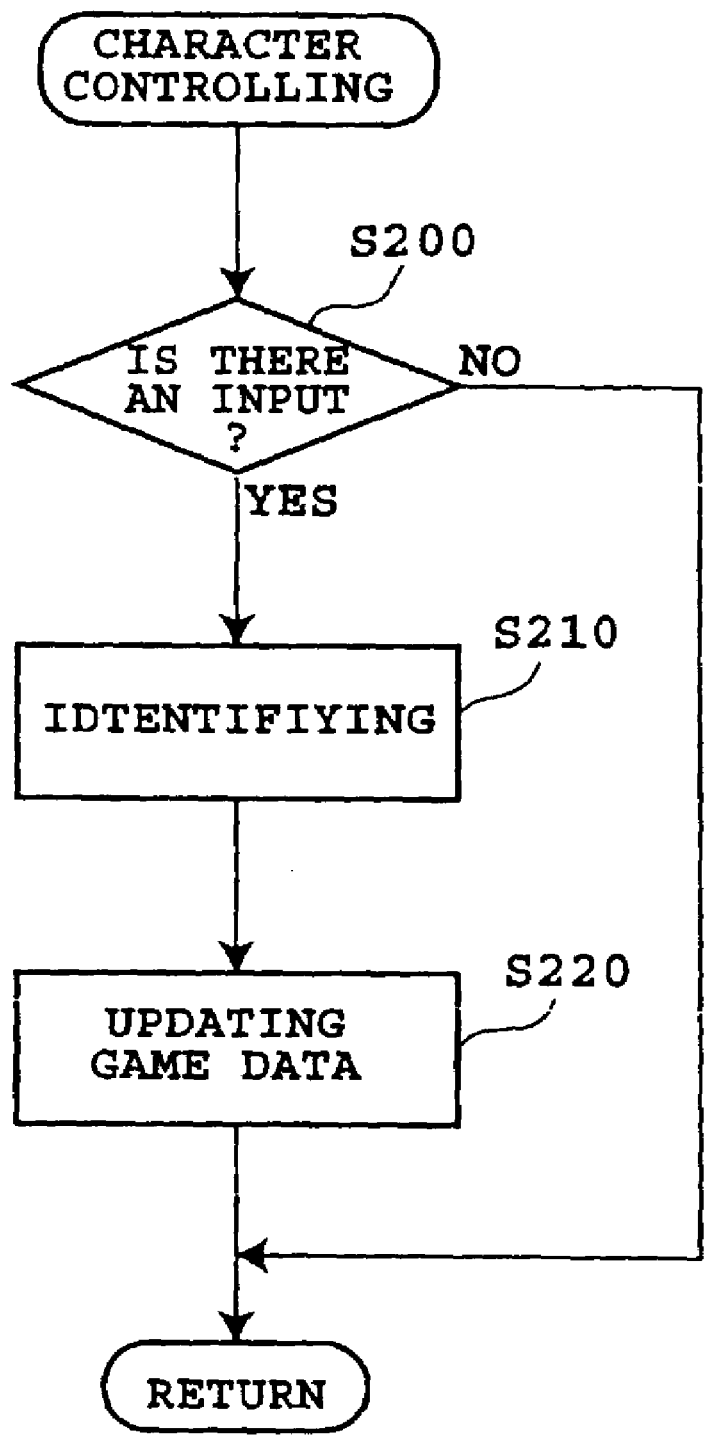
FIG. 15 is a flowchart showing a processing procedure for controlling a game character.

FIG. 15 shows a processing procedure of the character control program 3010 for performing the game processing involving the game character in the main processing procedure as described above. In FIG. 15, if there is any input from the controller 104, the CPU 200 identifies the operation content regarding the game character by discriminating an input operation button from the controller (from block S200 to block S210).

Specifically, it is identified which operation has been performed such as a movement operation of the game character on the display screen, an action operation of fighting with an enemy, or an action operation of collecting an item. On the basis of its identification result, the attribute values of the game character are updated using a certain action sub-program (function). For instance, if the movement of the game character to the right on the display screen is instructed by the controller 104, the position of the game character in the virtual space is updated proportional to the extent of the movement or operation of the controller 104 by the player. Then, the updated position is given as an instruction to the 3D graphics processing unit 220. The 3D graphics processing unit 220 then produces the displayed image of the game character using the updated positional information given by way of the received instruction.

The scene displayed on the display screen is automatically derived from, and on the basis of, the attributes of the game character. However, in this implementation, the player selects the scene to be displayed and its display environment (display mode of a CAT power such as the pause CAT power), while keeping the above CAT power. The action of the scene as defined by the selected scene, such as action by an enemy, that is processed along a second time axis that is different from a first time axis in a display mode as was described with respect to FIGS. 8–12. In the case where the character control program performs the game processing using the game attributes of the game character and the game attributes of enemies at block S30, the game attributes for the scene acquired along the second time axis are employed. If the player does not have any of the above described CAT powers, the scene to be displayed is automatically derived in accordance with a predetermined story (e.g. a specified order of scenes to be displayed), as previously described with respect to FIG. 7.

Figure 16:
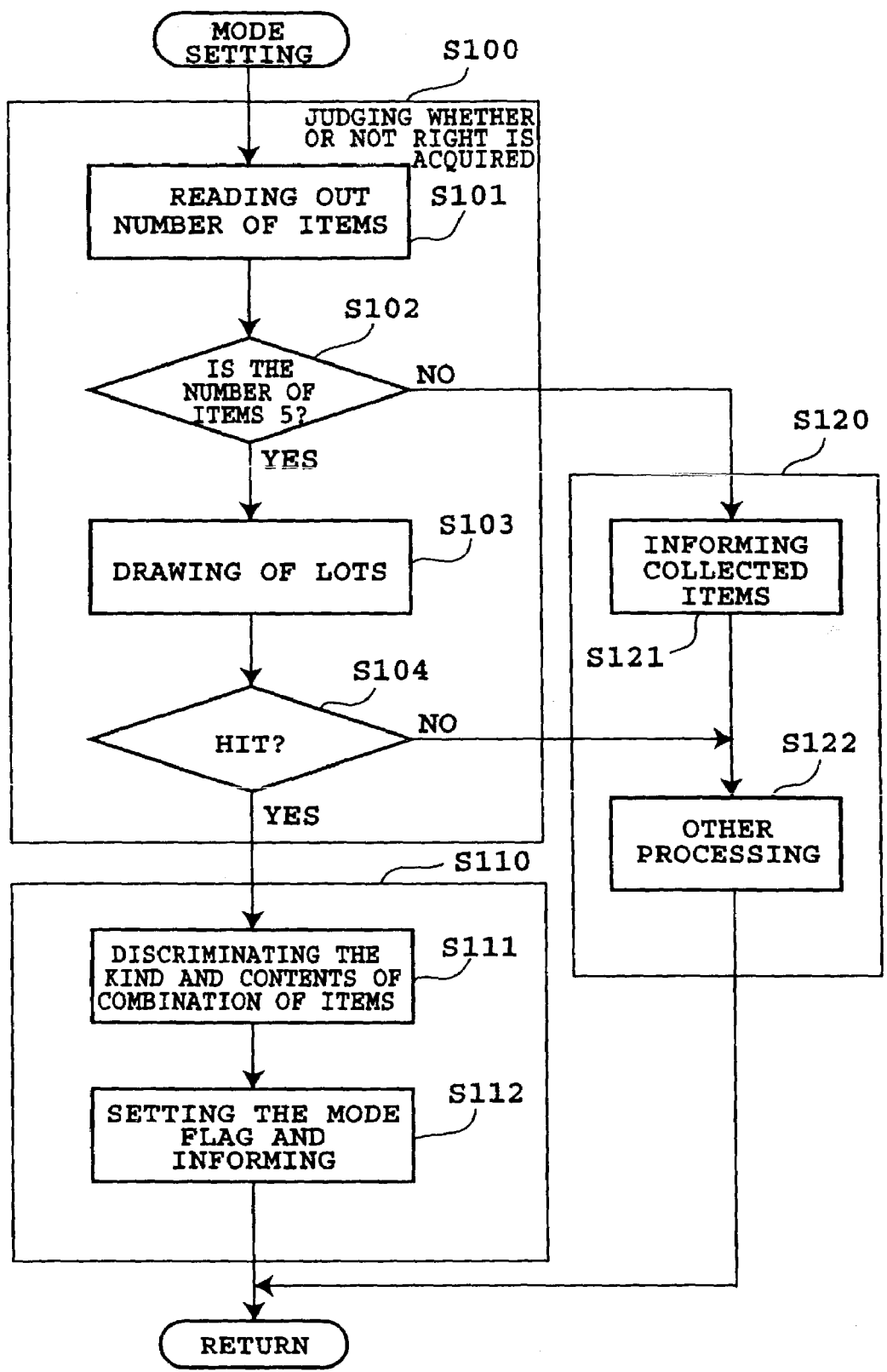
FIG. 16 is a flowchart showing details of a process for achieving a CAT power in the main processing procedure of FIG. 14.

FIG. 16 shows details of blocks S100, S110 and S120 depicted in FIG. 14. In this implementation, a plurality of CAT power flags are prepared corresponding to the display modes such as the display modes of the pause CAT power and the display mode of the fast forward CAT power. If the game character collects the item under the control of the controller 104 by way of manipulation by the player, the CPU 200 reads the number of collected items from the RAM memory 206. If the CPU 200 confirms that the number of collected items has reached five (5) (e.g. a 'YES' determination at block S101 to block S102), a lottery employing random numbers (block S103) for a hit or a miss is conducted. In the case where the lottery result is hit, the player gains a specific CAT power (e.g. pause, fast forward) that can then be used by the player to select a scene and display mode at any time. The lottery, which is optional, can be provided to make the game interesting to the player.

The CPU 200 discriminates the kind and contents of items that have been collected and stored in the RAM memory 206, and turns on the CAT power flag corresponding to the discriminated kind and contents of the items that have been collected. To inform the player of the CAT power acquired by the player, the indicator control program 3020 is instructed to perform a switch flashing process from block S104 to block S111 to block S112, an example of which was discussed above with respect to FIG. 5. Since flashing processes for displayed graphic images are, in general, well known, a detailed description of such a generality is not needed.

If the number of collected items is less than five (5), the determination result at block S102 is 'NO', and the procedure moves to block S121 where the identification number of the collected item is passed to the indicator control program 3020. The indicator control program 3020 performs a display control for displaying the item with the instructed identification number as was shown in FIG. 4. Thereafter, the CPU 200 performs other game processes such as updating the attribute of the collected item at block S122 and beyond. If the lottery result at block S103 is miss (e.g. a 'NO' determination at block S104), the processing for informing that the lottery is miss is performed at block S122 and beyond.

With respect to FIGS. 7 to 11, the processing for the normal display mode, and for the respective display modes of the CAT powers of pause, fast forward, slow forward, and rewind, will be described below. In this implementation, the order of scenes to be displayed for the story of the game is decided and the identification number of each scene and the various game attributes of the enemies to be displayed on the scene is stored in table format in the RAM memory 206. Also, a variable (referred to as an address pointer) for saving the number of each scene displayed on the display screen at the present time is defined in the main program. This address pointer points to the position of the table. Accordingly, the CPU 200 can acquire information such as the position of an enemy, the position of a collected item, and the sort of enemies on the display screen by reading a game attribute that is pointed to by the address pointer from the table.

Figure 17:
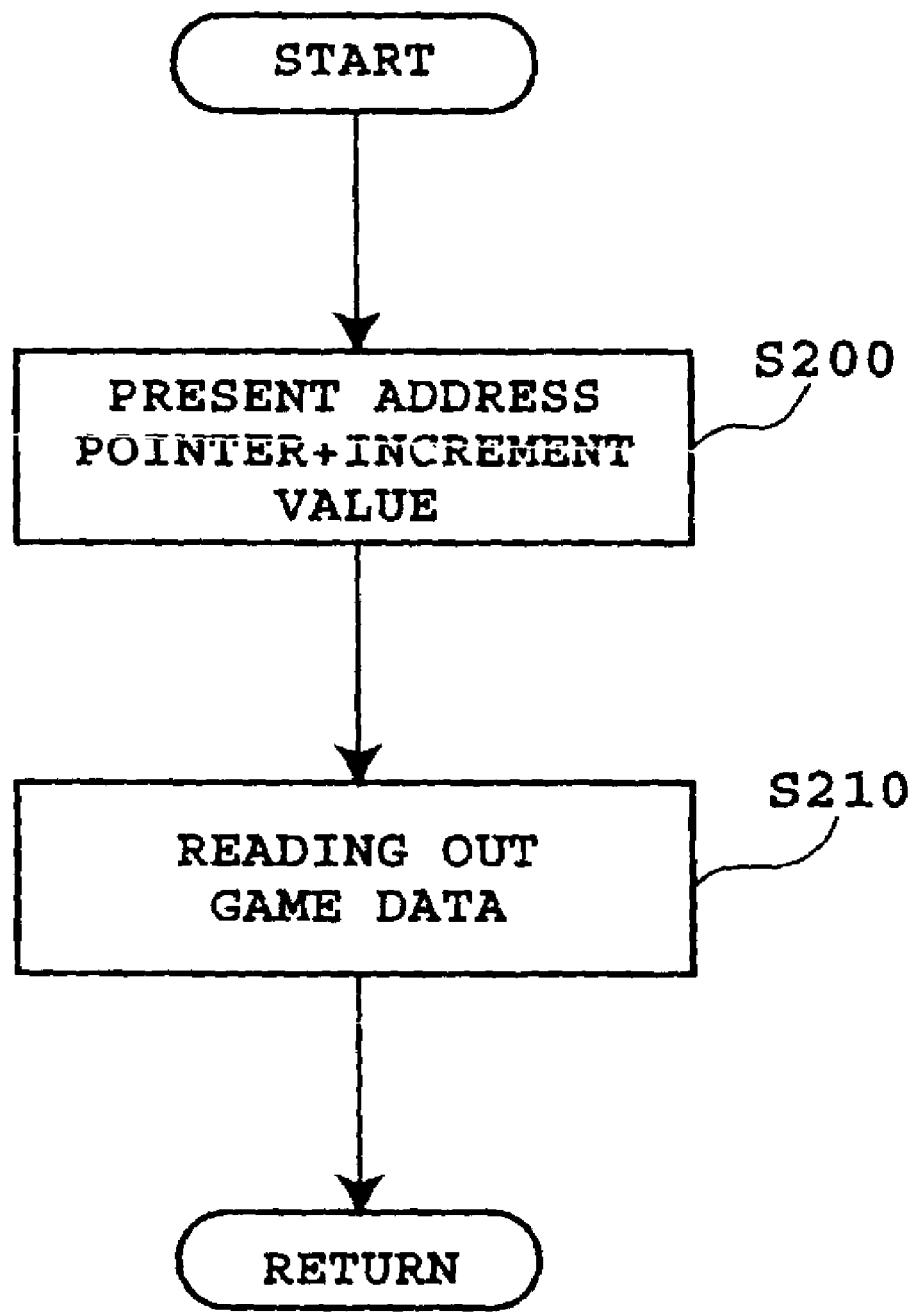
FIG. 17 is a flowchart for explaining the display process in a plurality of display modes with respect to FIG. 16.

FIG. 17 shows a processing procedure for reading game attributes. The processing procedure of FIG. 17 is executed periodically for designated periods. In all display modes, except for the display mode of the slow forward CAT power, the processing procedure of FIG. 17 is performed repetitively in synchronism with the display cycle of the display, while the address pointer is updated in succession. In the slow forward CAT power, the address pointer is updated after the processing procedure is performed twice using the same address pointer value. At block S200, the position of game attribute to be read from the above table is set up by adding an increment to the current address pointer value. At block S210, the game attribute is read from the designated position in the table stored in the RAM memory 206. In the normal display mode, the increment is set to "1" to represent the forward direction for a scene. When the pause CAT power is activated, the increment is set to "0", in which the same game attribute is employed for the display so that the display screen is seemingly paused.

In the display mode of the fast forward CAT power, the increment is set to "2" in the future direction. Thereby, the game attribute is read in the order of every other scene, such as the scene number "13", "15", so that the image display employing these game attributes is seemingly fast forwarded, as was described and shown with respect to FIG. 9. In this implementation, when two sorts of fast forward rates are provided, the increment can be variably set between one of the two different fast forward rates. In the display mode of the slow forward CAT power, the game attributes are read, employing the same address pointer value twice, as described above. The images that are displayed on the display screen using the read game attributes are seemingly slowly displayed, as was described and shown with respect to FIG. 10. In the display mode of the rewind CAT power, the increment is set to "−1" in the past (minus) direction. Thereby, since the address pointer value is decremented, the images displayed in the scene using the read game attributes are seemingly being rewound backwards in time, as was described and shown with respect to FIG. 11.

Figure 18:
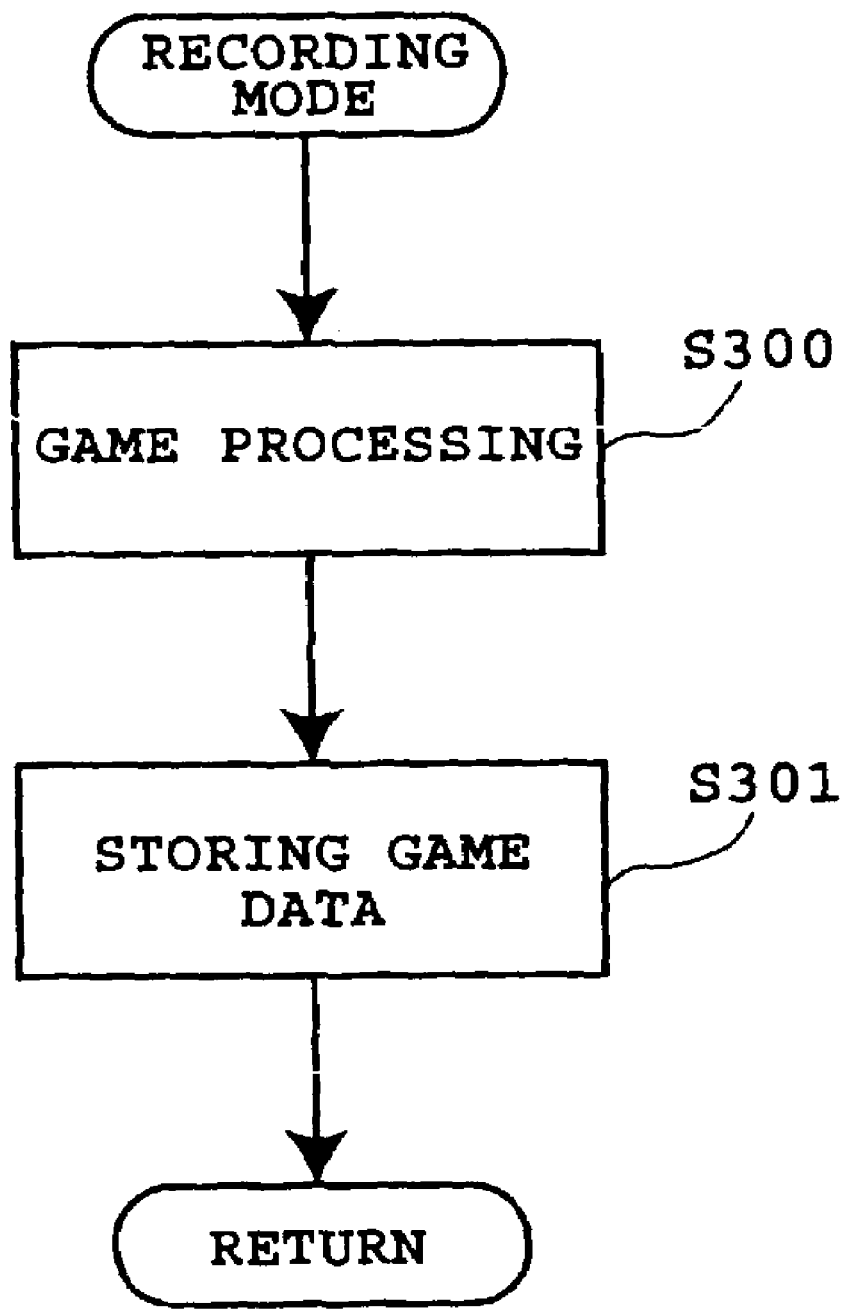
FIG. 18 is a flowchart showing an information processing procedure for recording.

FIG. 18 shows a processing procedure of the CPU 200 in the recording display mode. In the recording display mode, the scene is displayed on the display screen by reading the game attributes successively from a scene to a game attribute table in the same manner as in the normal display mode. Also, for the position of the game character, a display control processing is performed for displaying the game character at an instructed position on the display screen in accordance with the position instructions that are received from the controller 104. Furthermore, other game processes, including changing the game attributes, are performed as required (block S300). Then, all the game attributes (including the game attributes of the game character and the scene number) that are used at block S300 are stored in the RAM memory 206 (block S301). This processing is repeated until a predetermined time period has elapsed, or until the player releases the recording display mode (e.g. beats the enemy in a fight). In the reverse portion of the record/replay CAT power that occurs after the recording has been made, the game attributes that have been stored in the RAM memory 206 are read in the reverse order and the game character, the enemies, and the collected items are displayed on the display screen, using those game attributes that have been so read. The playback of the recorded portion is then performed by reading the game attributes from the top position where the recording was started.

Figure 19:
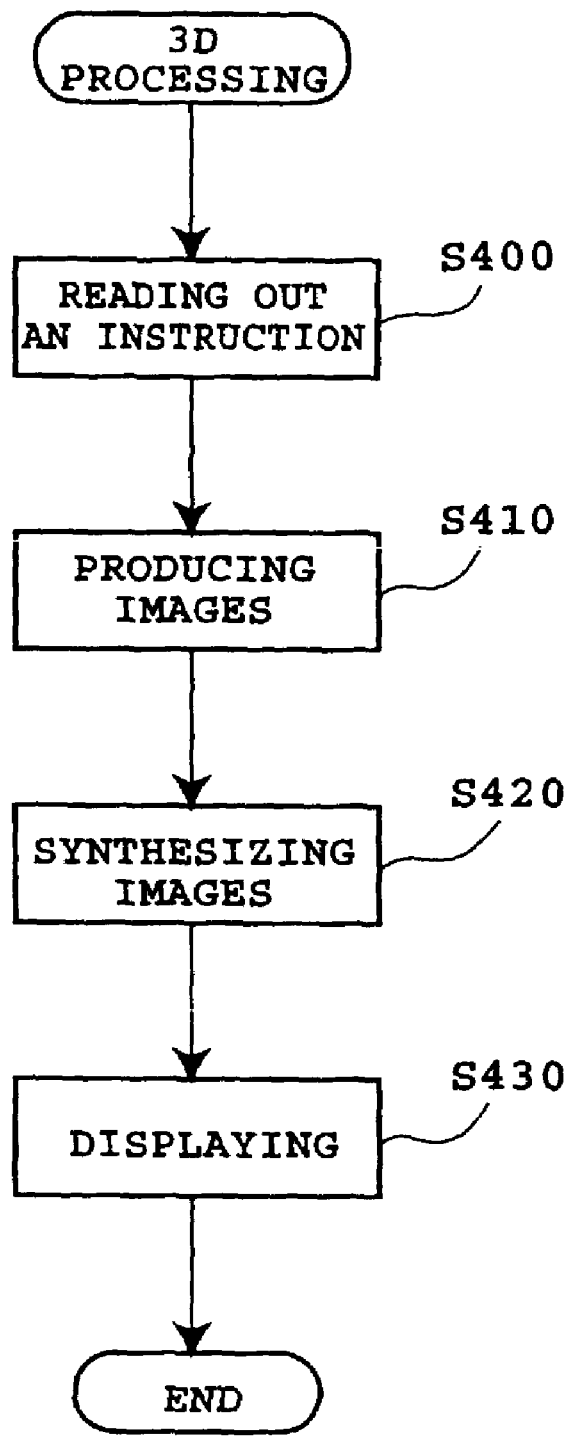
FIG. 19 is a flowchart showing the processing contents of a 3D image processing program.

FIG. 19 shows the processing contents of the 3D image processing program 3400. The 3D image processing can use conventional performance techniques that need not be described, but are here briefly described. The 3D graphics processing unit 220 receives an instruction that is passed from the main program 300 (block S400). This instruction can include various positions, such as the position of the game character, the position of an enemy, the position of a collected item, and/or the position of other objects on the virtual space. Next, the 3D processor produces an image of the game character as seen from a specific viewpoint of a camera direction on the 3D space and synthesizes an image thereof on an internal memory (block S410 to block S420). The synthesized image is sent to the display in synchronism with the display cycle of the display, and is displayed on the screen (block S430).

As described above, if the player satisfies a specific game condition (in one implementation, the collection of a total of five items), the player can select a display mode to be displayed for a scene from a designated CAT power. The game attributes possessed by the game character prior to the activation of the CAT power are kept while the designed CAT power is activate. Thereby, in this implementation, there is a sense in the game, as it is being played by the player, that the game character is traveling in time different that his surroundings. Accordingly, various visual cues of time travel by the game character can be provided in the rendered scenes during the course of the performance of the game.

In addition to the above various implementations, other implementations can be made, for example, as follows.

1) A treasure hunting game is exemplified in the above implementations, but other implementations include games that need not be applicable to treasure hunting.

2) A game machine with a television can be employed in the above implementations, but other implementations include various game machines such as a personal computer, a video arcade machine, and a portable game machine such as a hand held gaming playing machine. The game machine is not necessarily a stand alone but rather may be remotely connected to a server in which the game machine performs a game program supplied from the server having the game program (e.g. on-line gaming).

3) The game for making a 3D display is used in the above implementations, but other implementations include a game for making a 2D display.

4) The above implementations include a display of those items that were collected on the display screen, which collected items would merit the achievement of a CAT power, which achievement could be informed to the player by way of a display on the display screen, but other implementations include an informing method for informing the player of an achieved CAT power without use the display scene, such as by employing an audible voice.

Implementations can use sound in the fourth (4$^{th}$) dimension as fantasy aspect of the video game. Like video, sounds can be in storage as appropriate in the hard disk drive 208 or in the RAM memory 206. The rewind CAT power and the record/playback CAT power can feature sound that was recorded a forward dimension of time being played back in a reverse direction in time. Through these CAT powers the player can be given messages, clues and game hints for playing the video game through the playback of a sound file in reverse order of what the player had heard when the sound file was originally played in the forward direction. Moreover, the fast and slow forward CAT powers can be used to play sound files at respective different speeds than the normal display mode such that intelligible messages, clues and game hints for playing the video game can be heard.

When the rewind CAT power or the record/playback CAT power have been activated by a player, both show scenes in the game play in a reverse direction in time for a predetermined time period. The contents of the scenes can be controlled by the player's use of stick 132(1) to move the camera viewpoint towards a direction that the player wishes to view during the predetermined time in which the scenes are shown in the reverse direction in time. Thus, as the player desires, the camera viewpoint can be aimed in a direction that will show scenes in which the activity being depicted moves in the reverse direction in time during the predetermined time.

As described above with the foregoing implementations, the display rate of images displayed during the course of the game is not invariable as is conventional for prior art video games. Rather, the display rate for each scene does not depend only on the game attributes of the game character but also upon the player achieving a specific game condition. When so achieved, the player can then select a display rate for the scene from among various awards. These awards, referred to above as the CAT powers (e.g. pause, fast forward, slow forward, etc.), permit the display rate of items other then the game character to be changed along a second time axis different from a first time axis of the display rate of the game character. Also, since the game attributes of the game character are controlled along the first time axis that is different from the second time axis, it is possible to provide a new game effect as if the game character was traveling in the time. With different implementations, the game effect can be also realized by variably setting the display direction of the scene, such as the rewinding game effect or the recording/playback game effect.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A video game comprising computer instructions that, when executed by a computer, enable a player to change a rate at which a player-controlled game character is rendered with respect to a rate at which a player-controlled game character's surroundings are rendered, wherein the change in the rate at which the player-controlled game character is rendered with respect to the rate at which the player-controlled game character's surroundings are rendered provides a visual appearance that a time dimension of the player-controlled game character is different than a time dimension of the player-controlled game character's surroundings, wherein the visual appearance is that the player-controlled game character and the player-controlled game character's surroundings are moving in opposing directions in time.

2. A video game comprising computer instructions that, when executed by a computer, enable a player to change a time dimension of a player-controlled game character with respect to a player-controlled game character's surroundings effective to produce a visual appearance where the player-controlled game character and the player-controlled game character's surroundings are moving in opposing directions in time.

3. A video game system, comprising:
   a game console having memory and a processor;
   a game controller compatible with the game console; and
   a video game executed on the game console to facilitate a game character in surroundings in game play and during which a player issues commands with the game controller to:
   maneuver the game character in the game character's surroundings; and
   change a time dimension of the game character with respect to a time dimension of the game character's surroundings effective to enable a visual appearance to be generated where the player-controlled game character and the player-controlled game character's surroundings are moving in opposing directions in time.

4. The video game system as defined in claim 3, wherein the change of the time dimension of the game character with respect to that of the game character's surroundings comprises changing the rate at which the game character is rendered with respect to the rate at which the game character's surroundings are rendered.

5. The video game system as defined in claim 3, wherein:
   the video game supports a time change command user interface through which the game player issues the commands.

6. The video game system as defined in claim 5, wherein the commands to change the time dimension are mapped to actuators on the game controller.

7. A user interface for a video game comprising:
   an indication of one or more time dimension changes that a player can select to control a time dimension of a game character with respect to the game character's surroundings; and
   an interface to enable the player to issue a command to select one of the time dimension changes, wherein the selection of one of the time dimension changes effects a change in a rate at which the game character is rendered with respect to a rate at which the game character's surroundings are rendered, wherein the change in the rate at which the game character is rendered with respect to the rate at which the game character's surroundings are rendered provides a visual appearance that the player-controlled game character and the game character's surroundings are moving in opposing directions in time.

8. For use in a console-based video game system having at least one controller, a user interface for a video game in which a player controls a game character, the user interface comprising:
   an available time change display depicting those time changes that are available to be selected by a player to change the time dimension of a game character with respect to the game character's surroundings, wherein the depicted time changes represent commands that may be issued to select a change from the present time dimension to the selected time dimension of the game character with respect to the game character's surroundings; and an unavailable time change status display depicting those time changes that are presently unavailable to be selected by the player to control the time dimension of the game character with respect to the game character's surroundings.

9. The user interface as defined in Claim 8, wherein the selection of one said available time change is made by activating one or more actuators on the controller.

10. In a video game in which a game character is maneuvered by a player through the game character's surroundings, a computer-implemented method comprising:

presenting a time change command interface for the game character; and enabling the player to issue a command to change a time dimension of the game character to be different from that of the game character's surroundings, wherein the presenting comprises presenting a first graphical user interface to enable issuance of the command for one of several available changes in the time dimension of the game character.

11. A method as recited in claim 10, wherein the change of the time dimension of the game character to be different from that of the game character's surroundings is represented by a rendering of the game character at a rate that is different than the rate at which the game character's surroundings are rendered.

12. One or more computer-readable media comprising computer-executable instructions that, when executed, perform the method as recited in claim 10.

13. In a video game, a computer-implemented method comprising:

presenting, during game action, a lime status display to indicate a status of the lime dimension of a game character with respect to the surroundings of the game character; and selectively presenting a lime change user interface to facilitate selection of one or more lime dimension changes that a player can select to change the time dimension of the game character to be different from that of the game character's surroundings.

14. The method as defined in claim 13, wherein the change of the time dimension of the game character to be different from that of the game character's surroundings is represented by a rendering of the game character at a rate that is different than the rate at which the game character's surroundings are rendered.

15. A video game comprising computer instructions that, when executed by a computer, enable a player to change a rate at which a player-controlled game character is rendered with respect to a rate at which the player-controlled game character's surroundings are rendered, wherein the change in the rate at which the player-controlled game character is rendered with respect to the rate at which the player-controlled game character's surroundings are rendered provides a visual appearance that the time dimension of the player-controlled game character is different than the time dimension of the player-controlled game character's surroundings, wherein the visual appearance is that the player-controlled game character is moving forward in time while the player-controlled game character's surroundings are moving backwards in time.

16. A user interface for a video game comprising:

an indication of one or more time dimension changes that a player can select to control a time dimension of a game character with respect to surroundings of the game character; and an interface to enable the player to issue a command to select one of the time dimension changes, wherein the selection of one of the time dimension changes effects a change in a rate at which the game character is rendered with respect to a rate at which the game character's surroundings are rendered that provides a visual appearance that the game character is moving forward in time while the game character's surroundings are moving backwards in time.

* * * * *